United States Patent [19]

Gayler et al.

[11] 3,870,823

[45] Mar. 11, 1975

[54] TELEPHONE EXCHANGE METERING SYSTEM

[75] Inventors: Winston D. Gayler, Mountain View; James E. Ahern, Cupertino, both of Calif.

[73] Assignee: Vidar Corporation, Mountain View, Calif.

[22] Filed: Oct. 10, 1973

[21] Appl. No.: 404,873

[52] U.S. Cl. .......................................... 179/7 MM

[51] Int. Cl. .......................................... H04n 15/38

[58] Field of Search 179/7 R, 7 MM, 7.1 R, 7.1 TP, 179/8 R

[56] References Cited

UNITED STATES PATENTS

| | | | |
|---|---|---|---|
| 3,427,594 | 2/1969 | Lavenie et al. | 179/7 R |
| 3,651,265 | 3/1972 | Le Strat et al. | 179/7 R |
| 3,697,695 | 10/1972 | Pommerening et al. | 179/7 MM |

*Primary Examiner*—Kathleen H. Claffy
*Assistant Examiner*—Gerald L. Brigance
*Attorney, Agent, or Firm*—Flehr, Hohbach, Test, Albritton & Herbert

[57] ABSTRACT

Disclosed is an automatic telephone metering system for use with private automatic branch exchanges (PABX) in connection with direct distance dialed (DDD), wide area telephone service (WATS), and extended area service (EAS). The system records usage information in the form of the trunk number, the line or extension number, the called number, date, time of call start and duration of call. That usage information is acquired by a sampling system which samples the trunk lines of the exchange during the signaling portion of call placement. The trunk lines, when sampled, are analyzed by receivers assigned by a central processing unit to busy trunks. Each of the trunks has a trunk address (TA) and each receiver has a receiver address (RA). The receivers are associatd with trunks by sample addresses (SA). A memory for storing the usage information for each busy trunk is addressed by the trunk address.

16 Claims, 17 Drawing Figures

TELEPHONE EXCHANGE METERING SYSTEM

BACKGROUND OF THE INVENTION

The present invention relates to the field of telephone systems and particularly to message metering systems for detecting and storing information concerning subscriber use of private branch exchanges.

Message metering equipment is useful for recording information resulting from toll, long distance and other types of telephone service. Equipment to gather this information requires the ability to detect and store information. Existing equipment does not generally provide the capability of identifying which line or which extension number on the line is the calling party. Such information is particularly desirable in telephone usage accounting and telephone usage engineering. Usage accounting is the function of identifying particular lines or extensions which place a call to allow a particular department or person to be responsible for the cost of the calls made. Usage engineering is the function of providing communications engineers with call usage levels, grading indications and possible maintenance trends as well as furnishing accurate loading figures to determine overall equipment requirements.

While apparatus exists for monitoring the line or extension number usage on standard interfaces, improved systems are desirable which exhibit greater reliability and economy.

SUMMARY OF THE INVENTION

The present invention is a telephone metering system for detecting and metering telephone stations (handsets) using outgoing trunks. Information concerning the use of outgoing trunks is detected by a receiver and that information is stored in a memory.

The trunks of the system are typically connected to the telephone stations through a private automatic branch exchange (PABX). The trunks are sequentially addressed by a trunk address (TA) which functions to detect whenever a trunk is busy. Busy trunks are interrogated by the system to determine which telephone station is connected to the trunk. One of a plurality of receivers is assigned to and connected to a busy trunk to meter information about the trunk usage by the telephone station. The information from a receiver is stored in a unique memory location associated with a corresponding busy trunk. Information from the trunks is communicated to corresponding receivers over multiplexing paths. The multiplexing paths are selected by relating a sample address (SA) associated with a particular trunk to a receiver address (RA) associated with the particular receiver. The receiver address and the sample address are stepped in synchronism to time multiplex signals from the trunks to the receivers. The trunk address also addresses the memory for storing information from the receivers in memory.

DETAILED DESCRIPTION

Figure 1:
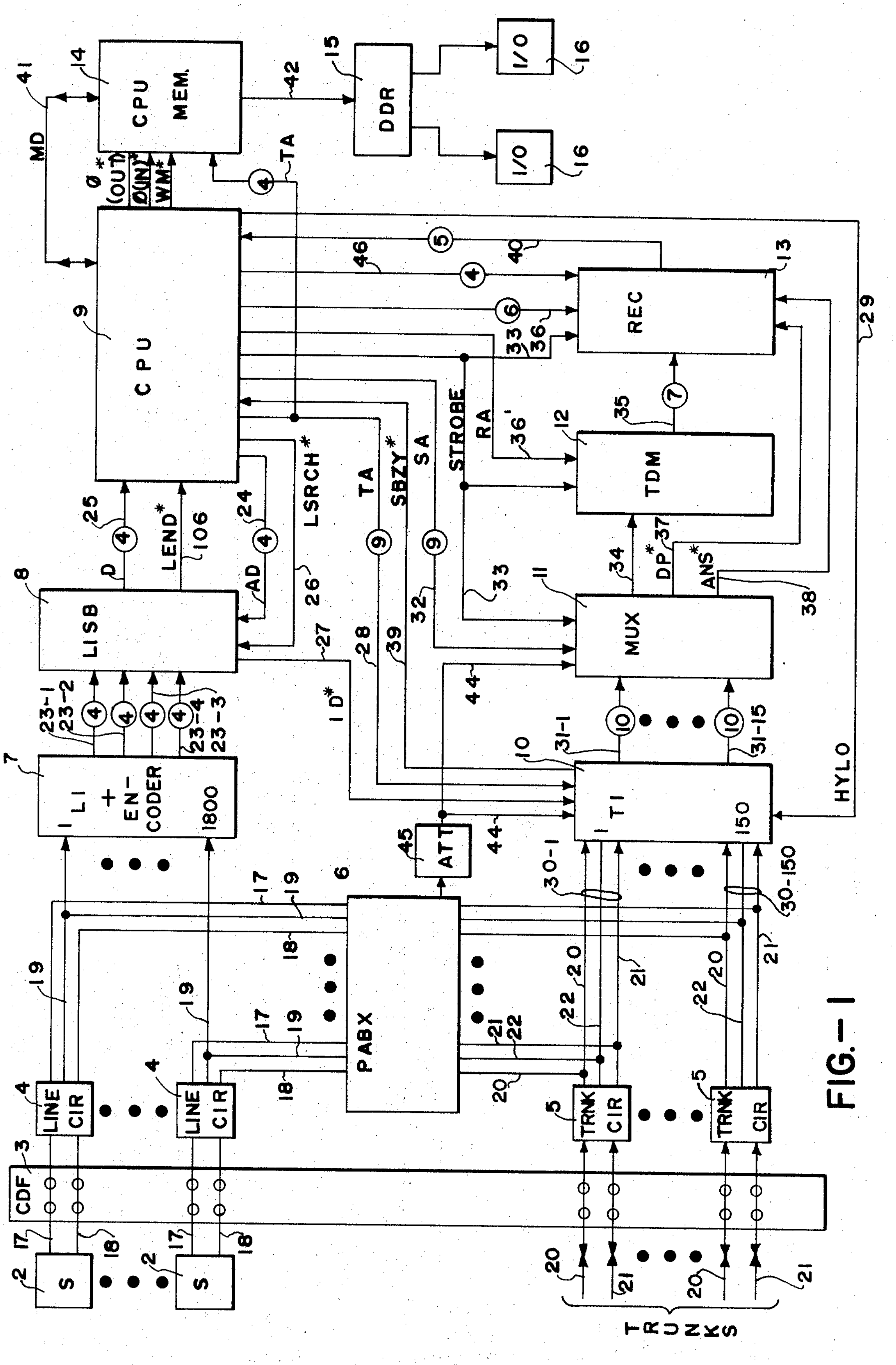
FIG. 1 depicts an overall block diagram of the metering system of the present invention connected to a telephone exchange.

Overall System - FIG. 1

Referring to FIG. 1, the telephone stations 2 are connected by tip and ring lines 17 and 18, respectively, over a central distribution frame 3 to respective line circuits 4. Within the line circuits 4, each tip and ring line is associated with a sleeve line 19. In a typical configuration, up to 1,800 stations and 1,800 associated line circuits are connected to an exchange 6. Each of the tip, ring and sleeve lines 17, 18 and 19, are available for connection by the exchange 6 to trunk tip, ring, and sleeve lines 20, 21 and 22, respectively. The trunk tip, ring and sleeve lines from the exchange 6 are connected to trunk circuits 5 and to the trunk interface (TI) 10. The trunk circuits 5 in turn have the trunk tip and ring lines 20 and 21 connected to the central distribution frame 3 where they are connected to the outgoing trunk lines.

The metering system is connected to the telephone system on both the station and trunk sides of the exchange 6. Each of the sleeve lines 19 from the line circuits 4 on the station side of the exchange 6 are connected as input to the line interface and encoder 7. In a typical configuration the exchange 6 is a private automatic branch exchange (PABX) of the 701B type which services up to 1,800 lines. Accordingly, the line interface and encoder 7 receives 1,800 input sleeve lines. The line interface encoder 7 is a tree circuit encoder which senses an ID signal on one of the sleeve lines 19 and identifies which one of the lines 19 has the ID signal by energizing the four binary coded decimal (BCD) output lines 23. The encoder 7 can be of any conventional design. The lines 23 are input to the line interface scanner bank 8 which functions, on command from the central processing unit (CPU) 9, to generate the identification signal (ID).

When generated the ID signal is connected through the trunk interface 10 to a busy one of the trunk sleeve lines 22. The ID signal from the scanner bank 8 is connected through the trunk interface and the exchange 6 to the associated sleeve 19. The associated and connecting sleeve 19 conducts the ID signal to the encoder 7 which thereby designates, on the BCD output lines 23, an identification of which station 2 is connected to the busy trunk 22. The BCD identification on lines 23 uniquely identifies one of 1,800 sleeves 19.

The scanner bank 8 is connected to the central processing unit 9 by the data bus (D) 25 for transmitting the BCD address of the station to the processing unit. The storage buffer 8 is addressed by the unit 9 by an address bus (AD) 24. Buffer 8 starts a station line search operation on the LSRCH* command from the line 26 and indicates the station has been formed by a LEND* signal.

The trunk interface 10, in addition to being utilized in line identification, functions to indicate on line 39 whether or not an addressed trunk circuit 5 is busy or not. The addressing of the trunk circuit 5 is by means of the central processing unit 9 which establishes a BCD trunk address (TA) on the 9-bit bus 28. The trunk address is input to the trunk interface 10 and is sequentially stepped so as to sample the busy condition of all of the trunks, one at a time, detecting the associated sleeve line 22. In a typical configuration, up to 150 trunk circuits 5 are available and each one is uniquely identified by a different BCD address on bus 28.

Each time a busy trunk is detected, a sleeve busy signal SBZY* is communicated to the central processing unit 9 via line 39 for updating a CPU memory 14 which has a corresponding location for each trunk. The trunk interface 10 additionally connects the signals on the 150 sets of tip and ring lines 20 and 21 to the multiplexer 11.

In FIG. 1, the multiplexer 11 receives an analog line for each of the trunk circuits 5. In the example of FIG. 1, 150 trunk circuits 5 are present so that 150 analog lines are input to the multiplexer 11. The analog lines are input to the multiplexer 11 in groups of 10 indicated as 31-1 through 31–15. The function of the multiplexer 11 is to select one out of 150 of the input lines for connection to the output lines. The output lines include an analog line 34, a dial pulse (DP) line 37 and an answer detection (ANS) line 38. The selection for a sample duration of one of the 150 lines in the multiplexer 11 is under control of the 9-bit, BCD sample address (SA) on lines 32. The sample address (SA) is derived from the central processing unit 9. Additionally, a strope signal on line 33 is also derived from unit 9 for designating proper timing.

In FIG. 1, the time division demultiplexer (TDM) 12 receives the analog line 34 from the multiplexer 11 and functions to time division demultiplex signals on line 34 out over the seven lines 35. The timing of the demultiplexer 12 is controlled by the strobe line 33 and the three high order bits of a receiver address (RA) on line 36' which are derived from the central processing unit 9.

In FIG. 1, receiver (REC) 13 functions to receive and analyze information from the demultiplexer 12 and the multiplexer 11. Receiver 13 typically includes up to fifty receivers. Only one of the 50 receivers 13 is operative at any one time. The operative receiver is designated by the 6-bit receiver address (RA) on lines 36 which are received from the central processing unit 9. A predetermined relationship is established between the sample address (SA) and the receiver address (RA) in the CPU 9 to associate a particular one of the fifty receivers 13 with a particular one of the trunk circuits 5. The information from the receivers 13 is output on the DIGIT bus (DB) 40. The bus 40 is connected to the fifty receivers 13 one at a time. The receivers 13 are of several different types. One type, a dial pulse receiver, is for detecting and counting dial pulses. Another type, an answer supervision receiver, is for detecting an answer supervision signal when the exchange 6 is of the type which has answer supervision. Another type, a multifrequency receiver, is for analyzing the signals in a frequency system. Another type, a ringback receiver, is for detecting the ringback tone to determine a called party answer.

In FIG. 1, the central processing unit 9 functions to control the other units by means of many control signals. When data is available from the receivers and other units, the unit 9 transfers the data out over a memory data (MD) bus 41 which connects as an input to and an output from the CPU memory 14. Memory 14 is a recirculating memory which is stepped in synchronism with the trunk address (TA). Output data appears on the memory data (MD) bus 41 and that data relates to the trunk defined by the current trunk address. In the absence of new data, the data bus 41 recirculates the old data for restorage into memory 14. The memory 14 is also connected to a data dump register (DDR) 15 which in turn connects to various I/O devices 16 for transferring data out from memory 14.

Figure 2:
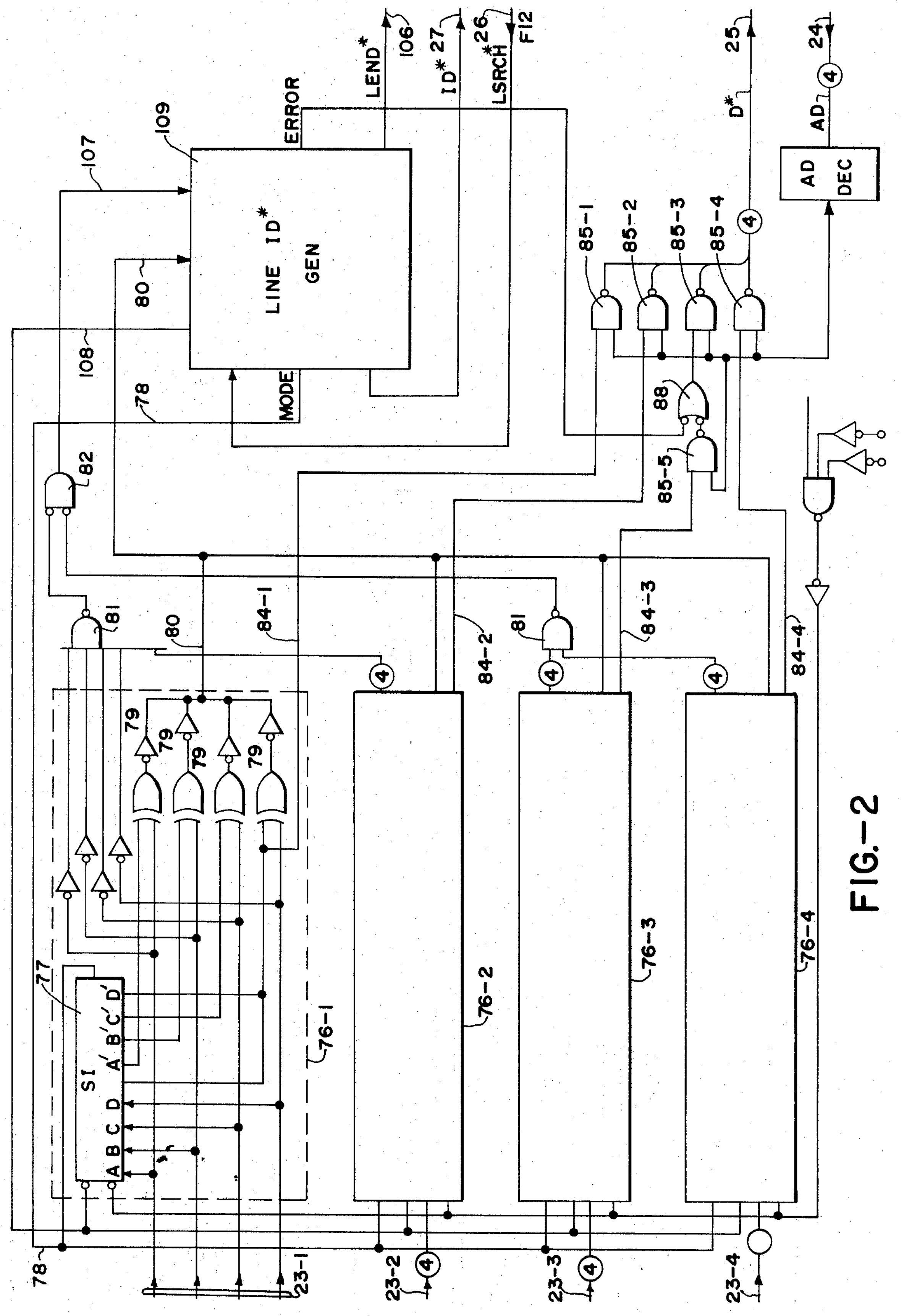
FIG. 2 depicts a schematic representation of the line interface storage buffer (LISB) circuitry of the FIG. 1 apparatus.

Line Interface Storage Buffer (LISB) - FIG. 2

In FIG. 2, the storage buffer bank 8 of FIG. 1 is shown in further detail. The BCD representation on each of the 4-bit lines 23-1 through 23-4 are input to the store and compare circuits 76-1 through 76-4, respectively. The details of store and compare circuit 76-1 are shown as typical and include a serial/parallel shift-register 77. The four BCD lines 23-1 connect to the four input stages A, B, C and D. The shift register 77 includes the four outputs A', B', C' and D'. Register 77 can be loaded either in a parallel manner or stepped in a serial manner depending on the 1 or 0 state of the mode control line 78. When line 78 is a 0 the shift register 77 right shifts and when line 78 is a 1 the input on line 23-1 is parallel loaded. The operation of the shift register 77 is to parallel load the BCD digit on line 23-1 and thereafter to shift that digit to the outputs A', B', C' and D'.

The EXCLUSIVE-OR gates 79 receive the signals on lines 23-1 and compare them to the previous entry into the shift register 77 which appears on the outputs A' through B'. The gate 79 outputs from gates 79 are then inverted and OR'ed onto the compare line 80. A logical 1 on the line 80 signifies that the input for two successive BCD address is the same.

The outputs A′ through D′ are also inverted and connected to a NAND gate 81. Gate 81 is connected to the NAND gate 82. An output from gate 82 signifies an all 0 condition of the address specified by the lines 23 which signifies that no station is being identified.

The D′ output from the shift register 77 is connected via line 84-1 to the NAND gate 85-1 for serially receiving the contents of register 77. In a similar manner, an output is derived from circuit 76-2 on line 84-2 to gate 85-2. The output from circuit 76-3 is through a NAND gate 85-5 and through NAND gate 88. Gate 88 receives as its other input an output from the NAND gate 86 which signifies an error condition as derived from the error latch 87. The gate 88 is then connected to the NAND gate 85-3.

Circuit 76-4 similarly has an output 84-4 which connects to NAND gate 85-4. The four gates 85-1 through 85-4, along with the gate 85-5, have as their control input the output from the AD decoder 90. The outputs from gates 85-1 through 85-4 form the four-bit D bus 25, which connects as an input to the CPU 9 of FIG.1. The gates 85 are selected whenever the CPU 9 of FIG. 1 addresses the LISB of FIG. 2 by means of a unique address on the AD bus 24. When so addressed, the output from the decoder 90 energizes the gates 85 and gates the contents from each of the circuits 76-1 through 76-4 onto the D bus 25. The information from bus 25 is connected to the MD bus 41 in FIG. 9 where it is transferred to the CPU memory 14 in FIG. 1.

In addition to the gating out of BCD address information, the scanner bank of FIG. 2 generates the ID* signal on line 27 in response to a line search command by the signal LSRCH* on line 26 from the central processing unit 9.

The line identification signal ID* is generated in the generator 109 of FIG. 2. The generator 109 is shown in detail in FIG. 15.

Figure 15:
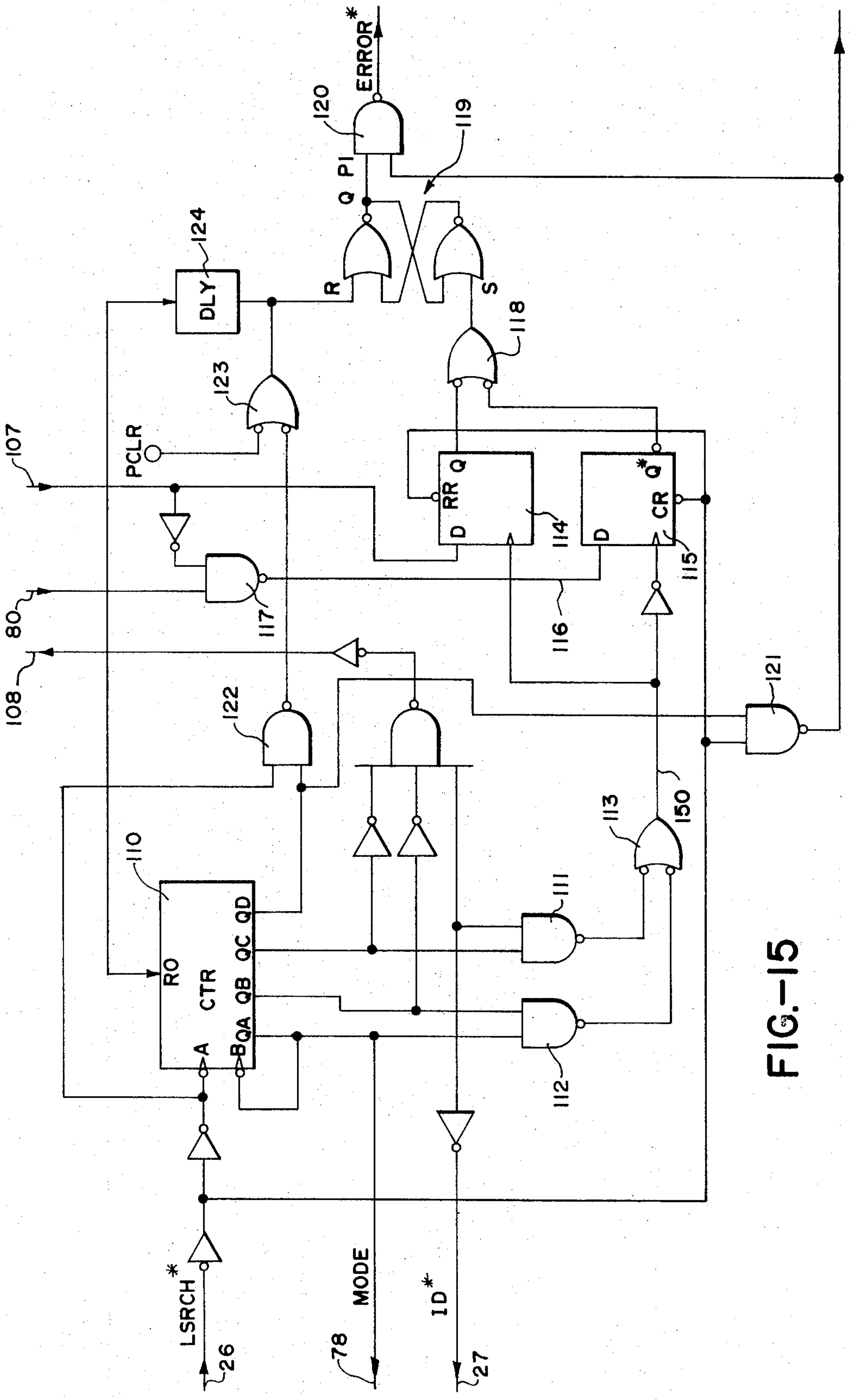
FIG. 15 depicts a schematic representation of the line identification generator employed within the apparatus of FIG. 2.

Referring to FIG. 15, the signal ID* is generated on line 27 as the inverted QA output from counter 110. Counter 110 is a 4-stage counter which counts the LSRCH* input pulses on line 26. An LSRCH* pulse is generated for each revolution of the CPU memory 14 in FIG. 1. The CPU memory 14 has a revolution approximately once every 20 milliseconds. Accordingly, the QA output is alternatively a logical 1 for approximately 20 milliseconds after the first LSRCH* pulse followed by a 0 for 20 milliseconds after the second LSRCH* pulse, and so on. Whenever QA is a 1, the MODE signal on line 78 sets the register 77 in FIG. 2 to parallel load. Gates 111, 112 and 113 produce, on line 114, a positive going transition for the third, fifth and seventh LSRCH* pulses and produce a negative transition for the fourth, sixth and eighth LSRCH* pulses. The signal on line 108 has a negative-going transition caused by the second LSRCH* signal which causes the register 77 in FIG. 2 to latch the input data on bus 23. In summary, the outgoing signal ID* on line 27 is active for the period between LSRCH* pulses 1 and 2 and latches the BCD address on bus 23, by the signal on line 108, at the end of the second pulse.

Each LSRCH* pulse on line 26 functions to clear flip-flop 115 producing a 1 on its Q* output. Also each LSRCH* pulse presets flip-flop 114 producing a 1 on its Q output. Flip-flop 114 receives a positive-going clock input for the LSRCH* pulses 3, 5, and 7 and at that those times is set by the line 107 signal. At those times, the ID* signal has been inactive for the preceding half cycle so that line 107 should be a logical 1 indicating an all 0 condition on the bus 23. If line on 107 is a logical 1, no error condition is detected and hence, flip-flop 114 does not change the 1 on its Q output. The LSRCH* pulses 4, 6, and 8 deliver to flip-flop 115 positive going clock signals which cause flip-flop 115 to follow the signal level on line 116. In the absence of an error, line 116 is a 0 and hence, flip-flop 115 retains a 1 on its Q* output at the indicated times. Line 116 is derived from NAND gate 117. To have a 0 output, gate 117 requires that the BCD address on bus 23 for the present LSRCH* pulse is the same as for the previous LSRCH* pulse. To have a 0 output, gate 117 also requires that the signal on bus 23 is not all 0's as indicated by the inverted signal on line 107. If the signal on bus 23 is not the same as the previous signal or the signal is an all 0 signal, gate 117 produces a logical 1 output which is input to flip-flop 115 causing it to set its Q* output to a 0.

A 0 output from either or both flip-flops 114 and 115 is detected in NAND gate 118 causing error latch 119 to be set with a 1 on its Q output. A 1 on the Q output causes an error signal to be output from gate 120.

After eight input LSRCH* pulses on line 26, counter 110 produces an output signal on its QD output which produces the LEND* signal on line 106. Also the QD signal is propagated through gate 122, gate 123 and delay 124 to reset counter 110 so it can again commence counting LSRCH* pulses and generate ID* signals.

Figure 3:
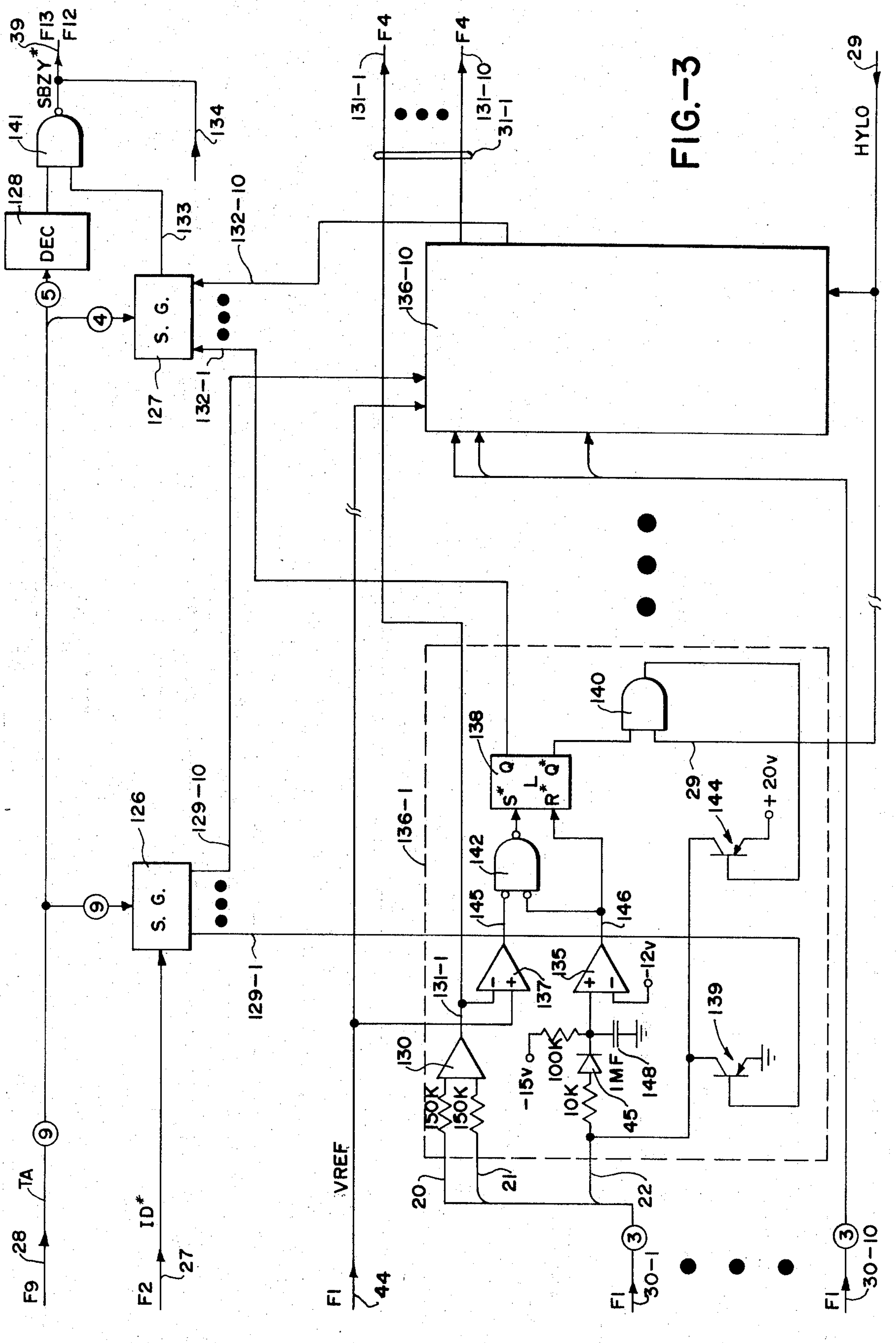
FIG. 3 depicts a schematic representation of the trunk interface (TI) circuitry of the FIG. 1 apparatus.

Trunk Interface (TI) - FIG. 3

In FIG. 3, one of the trunk interface circuit blocks is shown. Fifteen of the FIG. 3 circuit blocks comprise the trunk interface 10 of FIG. 1. Each circuit block of the FIG. 3 type handles 10 of the 150 sets of lines from the trunk circuits 5 of FIG. 1.

Referring to FIG. 3, trunk tip line 20 and trunk ring line 21 are input to a differential amplifier 130 which has an analog output line 131-1. For an outgoing or incoming call, line 131-1 is approximately +15 volts before and after the call but switches to +3 volts during the call. About eight milliseconds after line 131-1 goes to +3 volts for an outgoing call, the sleeve line input 22 goes from approximately −15 volts to ground. On an incoming call, line 131-1 switches from approximately +15 to +3 volts after the sleeve line 22 has gone from −15 volts to ground.

Differential amplifier 137 compares the signal on line 131-1 with the VREF signal on line 44. The VREF signal is generated from the exchange battery in the manner previously indicated in connection with the LISB 8 in FIGS. 1 and 2. When line 131-1 is +3 volts, line 145 output from amplifier 137 is a logical 0. When line 131-1 is +15 volts, line 145 is a logical 1.

Sleeve line 22 is input through a resistor, diode, capacitor network to the differential amplifier 135. When the signal on line 22 has been a −15 volts for a long time, the signal on line 146 is a logical 0. When the signal on line 22 has been at ground for a long time, the signal on line 146 is a logical 1. The resistor, diode, capacitor network to which line 22 connects is designed to delay the change in the signal on line 146 when the sleeve line 22 is going from ground to −15 volts to insure that the latch 138 will be reset when the call is terminated and the trunk goes into a not-busy condition.

The busy latch 138 is set by a logical 0 output from the gate 142 whenever there is a logical 1 on the reset input of line 146. Similarly, latch 138 is reset when a 0 appears on line 146 at a time when the output from gate 142 is a 1.

The operation of the interface circuit 136-1 for an outgoing call is as follows. Prior to the call, sleeve line 22 is at −15 volts for a long time and line 146 is a logical 0 causing reset line 147 to be a 1. Since the output from gate 142 is a logical 1 because of the 1 on line 145 latch 138 is held reset with a 0 on its Q output. When line 131-1 goes from +15 volts to +3 volts, line 145 goes from 1 to 0. The 0 on line 145 coupled with the 0 on line 146 forces gate 142 to have a 0 output. At this time, the signal on line 146 is a 0. When the sleeve 22 thereafter goes from −15 to 0 volts, a charging current occurs through the 10K resistor, the diode 45 and the capacitor 148 to ground. After the charging occurs, amplifier 135 switches the 0 on line 146 to a 1. That 1 on line 146 is immediately present on the reset input of latch 138 while the 0 output from gate 142 has not been removed. Therefore latch 138 is forced to a 1 on its Q output.

When the latch 138 has been set busy with a 1 on its Q output and thereafter the call is terminated, the signal on line 131-1 goes from +3 to +15 volts. At approximately the same time, line 22 goes from ground to −15 volts. Because of the charge across capacitor 148, however, the input to amplifier 135 does not immediately change. A delay exists while the capacitor 148 discharges through the 100K resistor. Therefore, line 146 is not switched to a 0 until long after line 145 goes to a 1 forcing gate 142 to have a 1 output. Thereafter, line 146 switches to a 0 insuring that the latch 138 is reset.

For an incoming signal, sleeve line 22 goes from −15 to ground before line 145 goes to a 0. Line 146 responsive to line 22 goes from 0 to 1. The 1 input to gate 142 forces its output to stay unchanged as a 1. when the signal on line 145 thereafter goes from +15 to +3 volts, gate 142 is already inhibited from changing its output to a 0 and therefore latch 138 stays reset. Latch 138, therefore, only outputs a busy signal on line 132-1 for outgoing calls and not for incoming calls.

In addition to setting the busy latch 138, the trunk interface circuit 136-1 receives ID signals on the line 129-1 for propagation through transistor 139 to the sleeve line 22. The ID signals are input to the circuitry of FIG. 3 on line 27 to the selection gates 126. Gates 126 function to select one of the 10 output lines 129-1 through 129-10 as a function of the BCD address on the trunk address line 28. When the trunk address on line 28 specifies the line 129-1, any ID signals present on line 27 are transmitted through the trunk interface circuit 136-1 to the sleeve 22.

In FIG. 3, ten trunk interface circuits are shown designated as 136-1 through 136-10. The trunk circuit 136-1 is shown as typical.

The analog outputs from the ten circuits 136-1 through 136-10 are combined into the 10-line bus 31-1 which is shown, in FIG. 1, as one of the fifteen 10-line buses 31 which connect to the multiplexer 11.

In FIG. 3, each of the circuits 136 includes a busy output. The busy outputs are designated 132-1 through 132-10, respectively. The busy outputs 132 are input to the select gates 127 which function, in response to the trunk address input on line 28, to provide one output at a time on the line 133. The select gates 127 are responsive to the four low-order bits of the BCD address on the line 28. Decoder 128 is responsive to the five high-order bits for selecting through the NAND gate 141, the busy signal on line 133 to provide an output on the busy line 39 which connects to the central processing unit 9 in FIG. 1. Additionally, each of the other fifteen circuits like that shown in FIG. 3 has a corresponding input from a corresponding NAND gate like gate 141 which connects to the line 39. Those corresponding inputs are indicated as input to line 39 on line 134. The signal on line 39 indicates whether or not the trunk specified by the current trunk address (TA) on line 28 is busy.

Figure 4:
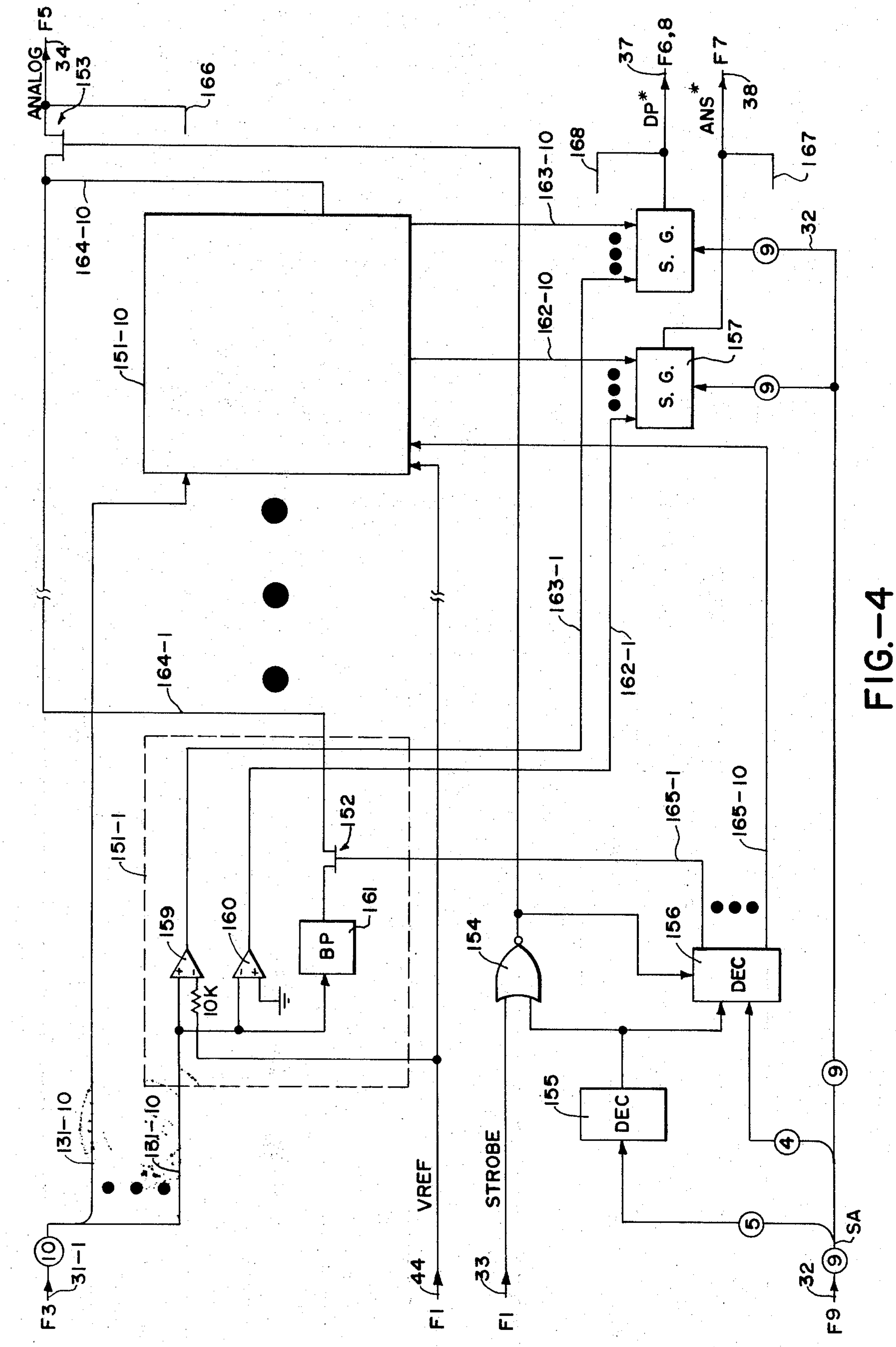
FIG. 4 depicts a schematic representation of the multiplexing (MUX) circuitry which is one of fifteen identical circuits which form the multiplexer within the FIG. 1 apparatus.

Multiplexer - FIG. 4

Figures 10, 11:
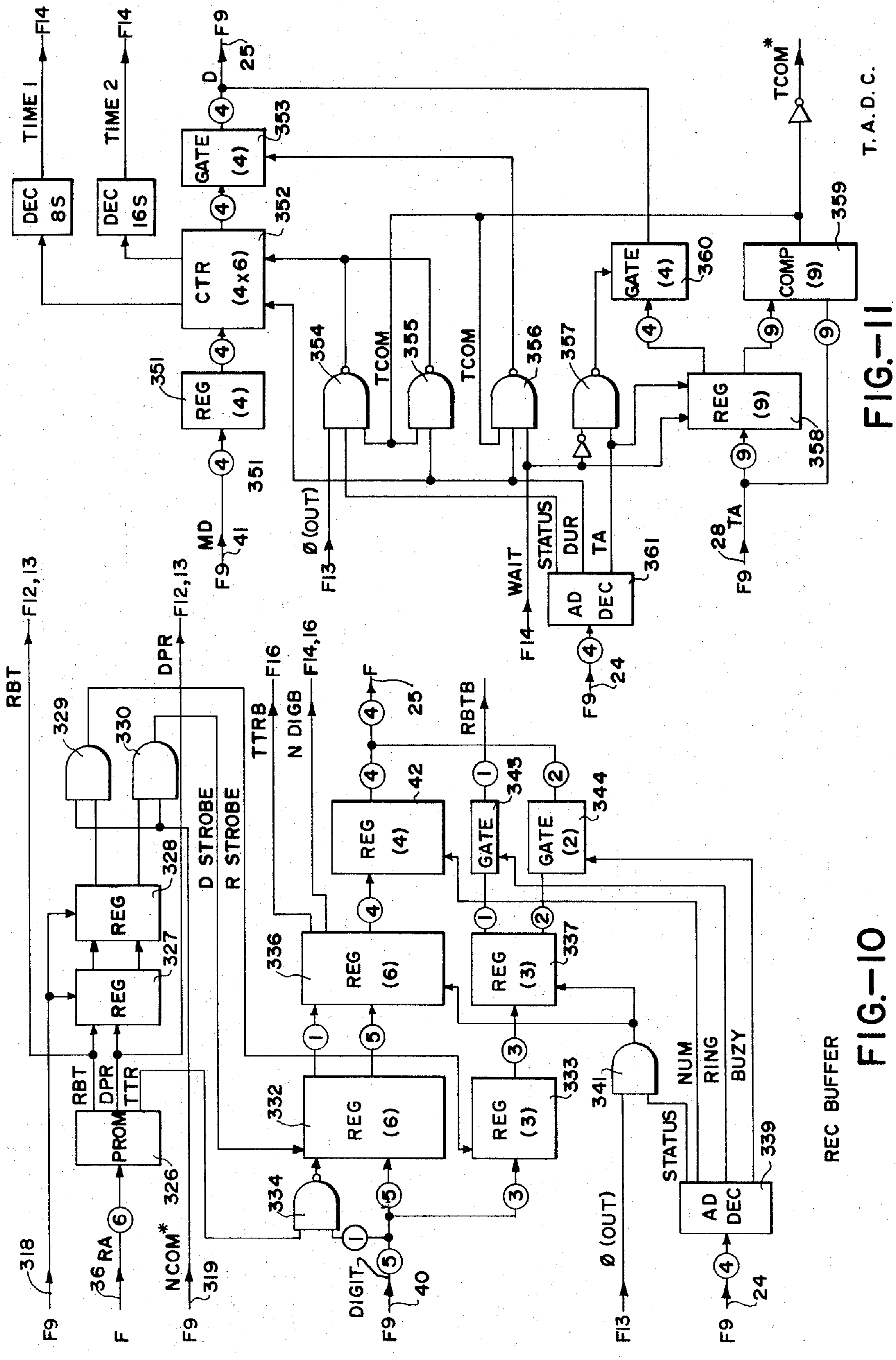
FIG. 10 is a schematic representation of a receiver buffer which is one of the devices within the central processing unit of FIG. 9.
FIG. 11 depicts a schematic representation of the trunk address and duration counter (TADC) which forms a portion of the CPU control within the central processing unit of FIG. 9.

In FIG. 4, a typical one of the fifteen multiplexer blocks which form the multiplexer 11 of FIG. 1 is shown. The fifteen groups of input buses 31-1 through 31-15 in FIG. 10 are input to each of the fifteen multiplexer blocks, respectively. The block connected to the input 31-1 is shown as typical in FIG. 4. The multiplexer block in FIG. 4 includes 10 multiplexer circuits 151-1 through 151-10 which receive respectively the input analog lines 131-1 through 131-10. The analog line 131-1 is typical in the multiplexer circuit 151-1. Within circuit 151-1, line 131-1 is compared in an amplifier 159 to a reference signal VREF on line 44 to provide a signal DP* on line 162-1 to indicate the recognition of a dial pulse by the signal on line 163-1. Similarly the signal on line 131-1 is compared to ground in an amplifier 160 to provide a signal ANS* which indicates the detection of an answer supervision signal on line 162-1. The analog signal on line 131-1 is also detected by a filter 161. Filter 161 has a bandpass between the −3db points from 300 to 3300Hz. The signal from filter 161 is sampled by field-effect transistor 152 to provide an output on line 164-1. The conduction of transistor 152 is under control of a BCD sample address (SA) which appears on bus 32 from the central processing unit 9 in FIG. 1.

The four low-order bits of the sample address are decoded in decoder 156, whenever the five high-order bits are also decoded in decoder 155. The output from decoder 156 selects the transistor 152 and provides a filtered output on line 164-1. In a similar manner, decoder 156 decodes a transistor gate signal for each of the lines 165-1 through 165-10 for each of the circuits 151-1 through 151-10. The high-order decoder 155 also is connected to the NOR gate 154 which, together with the STROBE signal renders the field-effect transistor 153 in the conduction state. The combination of transistors 153 and 152 both in the conduction states presents a filtered sample of the signal on line 131-1 on the output line 34. In a similar manner each of the other multiplexer blocks have inputs to the line 34 when they are addressed, at a different time from the block of FIG. 4, by the sample address. Those inputs are generally indicated by line 166 in FIG. 4.

The dial pulse lines 163-1 through 163-10 are input to selection gates 158. Selection gates 158 are addressed by the sample address on bus 32 to select the inputs one at a time and connect them to the output line 37. Each of the other fourteen circuit blocks also provide a connection to the line 37 as represented by the line 168.

The answer supervision lines 162-1 through 162-10 are also input to selection gates 157 and are selected one at a time by the address on bus 32 for connection to the output line 38. Line 38 receives on input from each of the other fourteen multiplexer blocks as represented by the line 168.

In FIG. 4, output line 34 includes an analog sample of the signal impressed between the tip and ring lines of the trunk circuit specified by the sample address on bus 32. Output line 37 is a digital representation of the dial pulses on the tip and ring lines of the trunk circuit specified by the address on bus 32. Output line 38 contains a digital representation of an answer supervision indication, when present, on the tip and ring lines of the trunk circuit specified by the sample address on bus 32.

Figure 5:
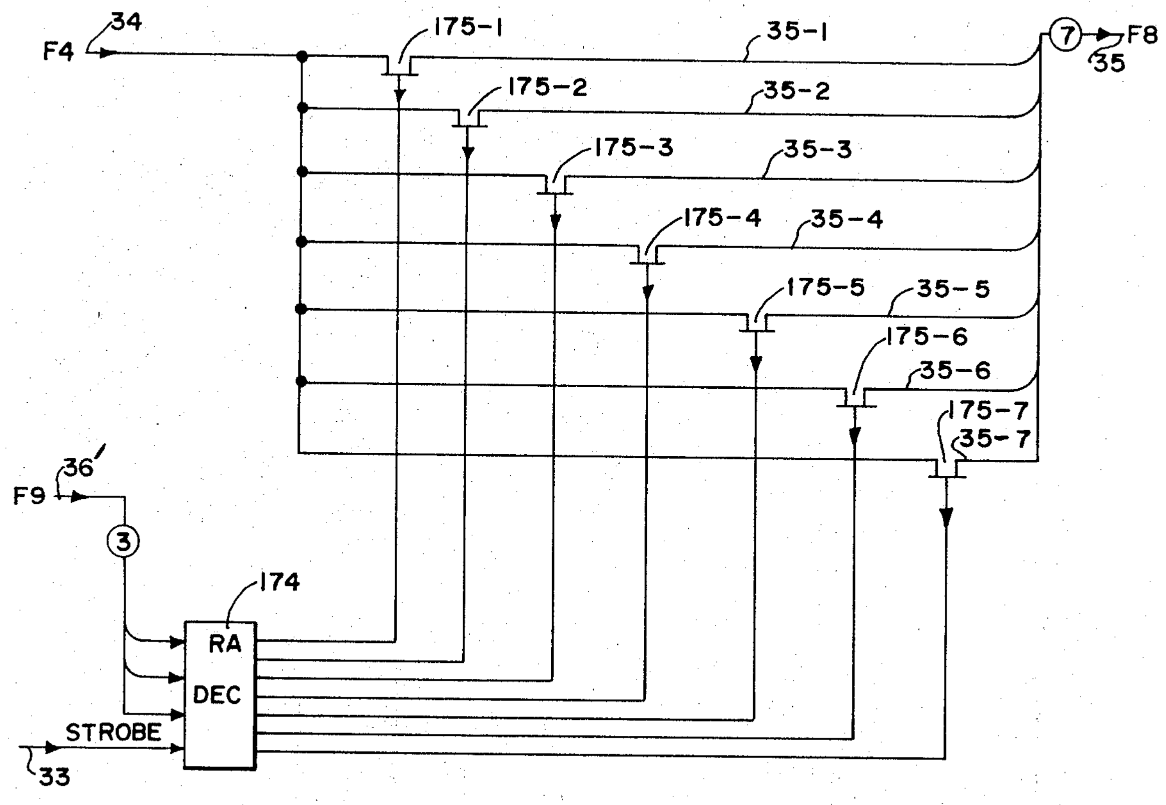
FIG. 5 depicts a schematic representation of the common time division demultiplexing (TDM) circuitry of the FIG. 1 apparatus.

Time Division Multiplexer (TDM) - FIG. 5

In FIG. 5, the signals from line 34 on the multiplexer are partially demultiplexed for distribution to the receivers 13 of FIG. 1 via lines 35. The seven lines 35-1 through 35-7 are connected to the single line 34 through field effect transistors 175-1 through 175-7. The transistors 175 are turned on one at a time by operation of the decoder 174. Decoder 174 operates to decode the three high-order bits of the receiver address as they appear on line 36' and at a time control by the strobe on line 33.

Figure 6:
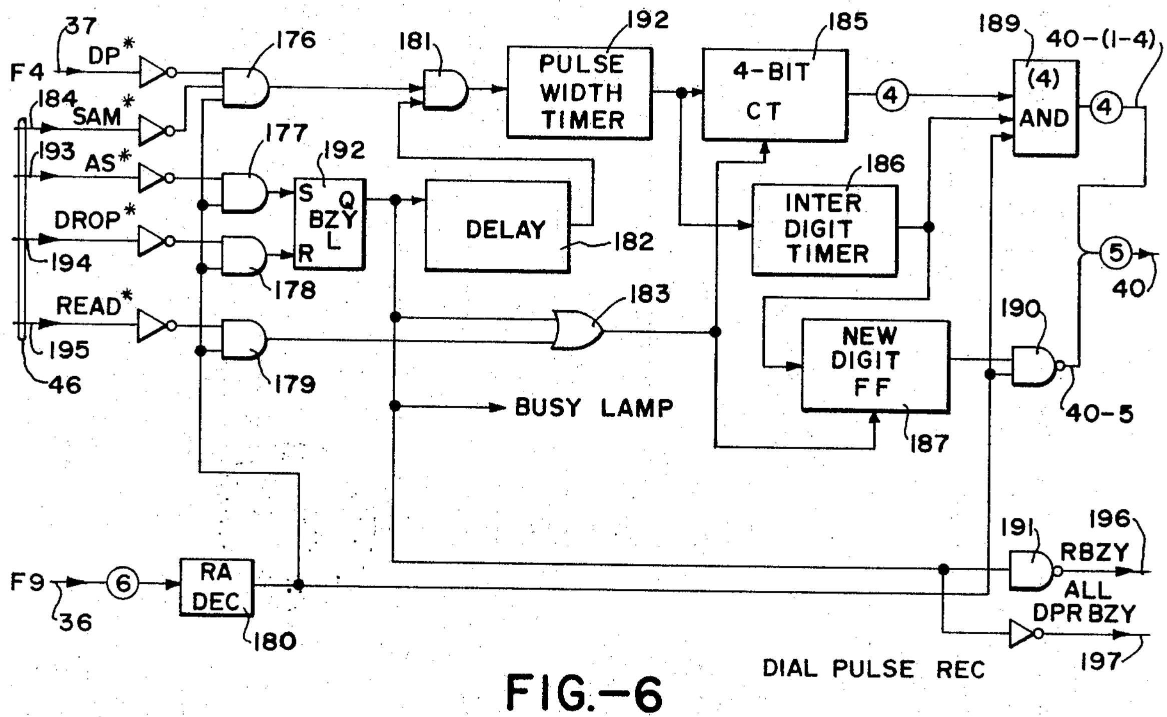
FIG. 6 depicts a schematic representation of a dial pulse receiver which is one of fifty receivers (REC) in the FIG. 1 apparatus.

Dial Pulse Receiver - FIG. 6

In FIG. 6, a dial pulse receiver is shown which is one or more of the fifty receivers 13 in FIG. 1. dial pulse receiver of FIG. 6 receives the dial pulse line 37 through a AND gate 176 and produces output information concerning that dial pulse which is transmitted to the central processing unit 9. The dial pulse receiver is only operative when addressed by a receiver address RA input on the bus 36 to a decoder 180. Decoder 180 when addressed enables the gate 176 and through gate 181 allows each dial pulse received to be timed. If the pulse is of sufficient duration, it is counted in counter 185. Counter 185 is a conventional 4-bit binary counter.

Gates 177 and 178 are operative, under control of DROP* and AS* signals from the central processing unit 9, to set the busy flip-flop 192. The busy flip-flop 192 is set or reset by the central processing unit 9 in order to control the busy or not-busy state of the dial pulse receiver of FIG. 6. The flip-flop 192 when set to busy enables the digit sensing portion by enabling a gate 181, 191 milliseconds (the delay of delay 182) after flip-flop is set. Also the flip-flop 192 holds the line 197 low to signify that all dial pulse receivers are busy. Also, gate 191 returns the receiver busy signal RBZY* on line 196 to the central processing unit 9. The inter digit timer 186 operates 191 milliseconds after the last digit from timer 192 to set the new digit flip-flop 187. Flip-flop 187 notifies the central processing unit 9 over the new digit line 40-5 that a digit has been dialed. Thereafter, the CPU gates out with a READ* signal the four-bit DIGIT bus 198 to obtain the dialed digit from counter 185 and the new N DIGIT signal from flip-flop 187. The OR gate 183 clears the flip-flop 187 and counter 185 to enable the circuitry to receive the next digit. The gates 189, 190 and 191 are operative to gate out information to the CPU only when the decoder 180 has an output which signifies that the receiver of FIG. 6 is being addressed by the CPU.

Figure 7:
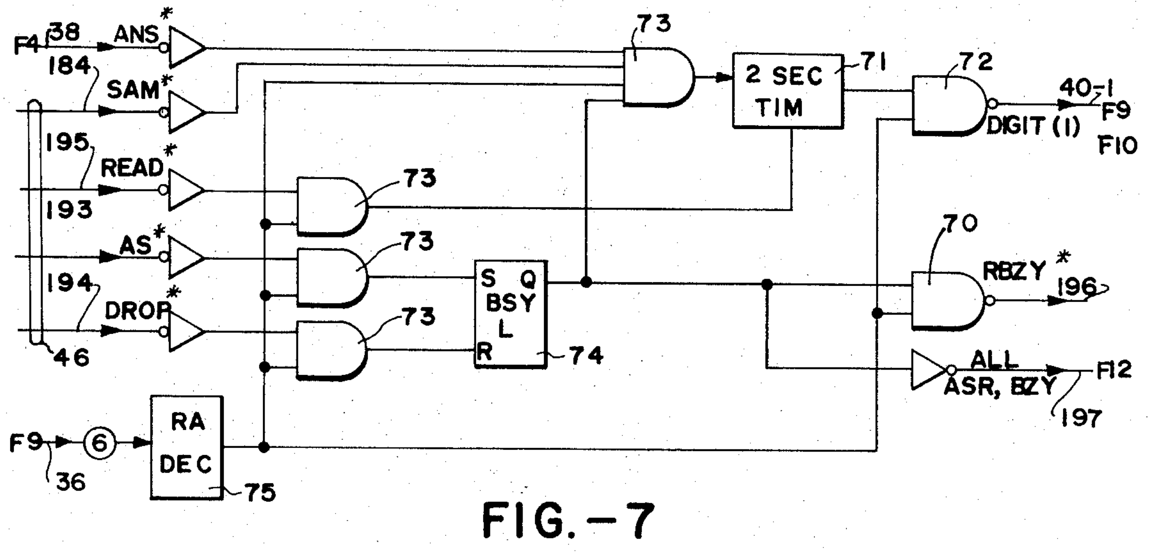
FIG. 7 is a schematic representation of an answer supervision receiver which is one of the fifty receivers (REC) of the FIG. 1 apparatus.

Answer Supervision Receiver - FIG. 7

In FIG. 7, an answer supervision receiver is shown which is one of the fifty receivers 13 in FIG. 1. The receiver of FIG. 7 functions to receive the ANS* signal on line 38 from the multiplexer 11 of FIG. 4 to determine when a call has been answered. Like each of the other receivers 13 of FIG. 1, the receiver of FIG. 7 receives the receiver control bus 46 which contains the signals SAM*, READ*, AS*, and DROP* on the lines 184, 195, 193 and 194, respectively. The answer supervision receiver of FIG. 7 is addressed by the RA bus 36 which is decoded in the receiver address decoder 75. Decoder 75 is any well known decoder which provides a unique output for one unique combination of the bits on bus 36. When decoder 75 provides an output, it enables the input gates 73 and the outgates 72 and 71. The AS* signal, through an input gate 73, is operative to set a busy latch 74. The DROP* signal when gated by an input gate 73, is operative to reset the busy latch 74. The ANS* signal is ingated by the receiver address decoder 75, the SAM* signal on line 184 at a time when the busy latch 74 is set with a 1 on its Q output. When those gating conditions are met, the ANS* signal on line 38 is timed in a two-second timer 71. The timer 71 provides an output to the outgate 72 whenever a READ* signal, after ingating, appears. The presence of an answer supervision pulse for a two-second duration is output on to the DIGIT (1) bus line 40-1 which is one of the five lines on the DIGIT bus 40. Also the busy condition of the receiver is gated out through output gate 71 whenever decoder 75 provides an output to the RBZY* line 196. the line 196 is OR'ed with all the other lines 196 from each of the other receivers and is compared with the corresponding location in the receiver memory 309 of FIG. 9. If the receiver memory and the busy latch of the corresponding receiver do not correspond, an alarm is sounded. The ALLASRBZY* signal on line 197 connects to the OR gate 378 in FIG. 12.

Figure 8:
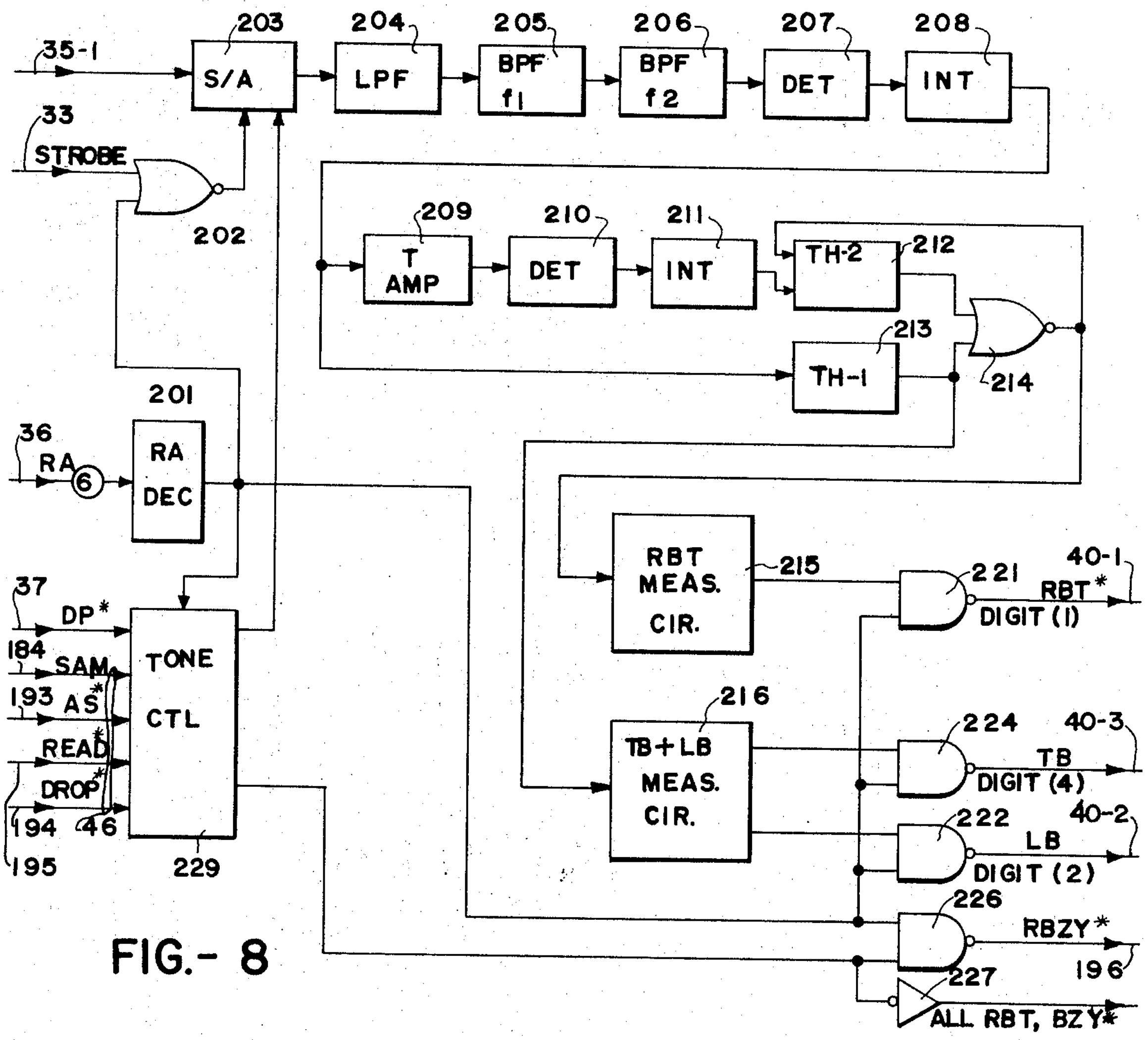
FIG. 8 is a schematic representation of a ring back tone receiver which is one of the fifty receivers (REC) of the FIG. 1 apparatus.

Tone Receiver - FIG. 8

In FIG. 8, the tone receiver is one of the fifty receivers 13 in FIG. 1 and is used to detect a called-party answer by determining when the ringback tone stops. The tone receiver is connected to a typical line 35-1 which is received from the demultiplexing common equipment of FIG. 5. The receiver of FIG. 8 is active only when addressed by the receiver address on bus 36 which is input to the decoder 201. Decoder 201 activates NOR gate 202, at a time when a strobe pulse appears on line 33, which enables the sample and hold circuit 203. The sample and hold circuit 203 receives the analog input signal on line 35-1. The sample and hold circuit 203 is operative only when the receiver of FIG. 8 has been assigned by the central processing unit 9 as determined by the tone control 229. When an input signal on line 35-1 is received by the sample and hold circuit 203, it is propagated through filters 204, 205 and 206 to a detector 207 and an integrator 208. The integrated signal output from integrator 208 is passed through an amplifier 209, a detector 210, and another integrator 211 where it is threshold detected by a threshold circuit 212. Another output from integrator 208 is passed directly to a threshold detector 213. The outputs from detectors 212 and 213 are compared in a NOR gate 214 from which provides an input to a ringback tone measuring circuit 215. The output from the threshold detector 213 is input to a trunk busy and line busy measuring circuit 216. The measuring circuit 215 provides its output to ringback tone line 217 through a gate 221 to signify the presence or absence of a ringback tone. Similarly, the trunk busy output from measuring circuit 216 is connected to line 222 through a gate 224 and the line busy signal from measuring circuit 216 is connected through gate 222. Gates 221, 222 and 224 are enabled when the decoder 201 has an output which signifies that the receiver of FIG. 8 is being addressed.

The assignment and the dropping of the receiver of FIG. 8 is carried out in a manner analogous to the assignment and the dropping of the receiver of FIG. 6.

Further details of the tone receiver are given in the application RINGBACK TONE APPARATUS AND TELEPHONE METERING SYSTEM Ser. No. 438,418, filed Jan. 31, 1974, invented by Clare G. Keeney and assigned to Vidar Corporation Central Processing Unit - FIG. 9

Figure 9:
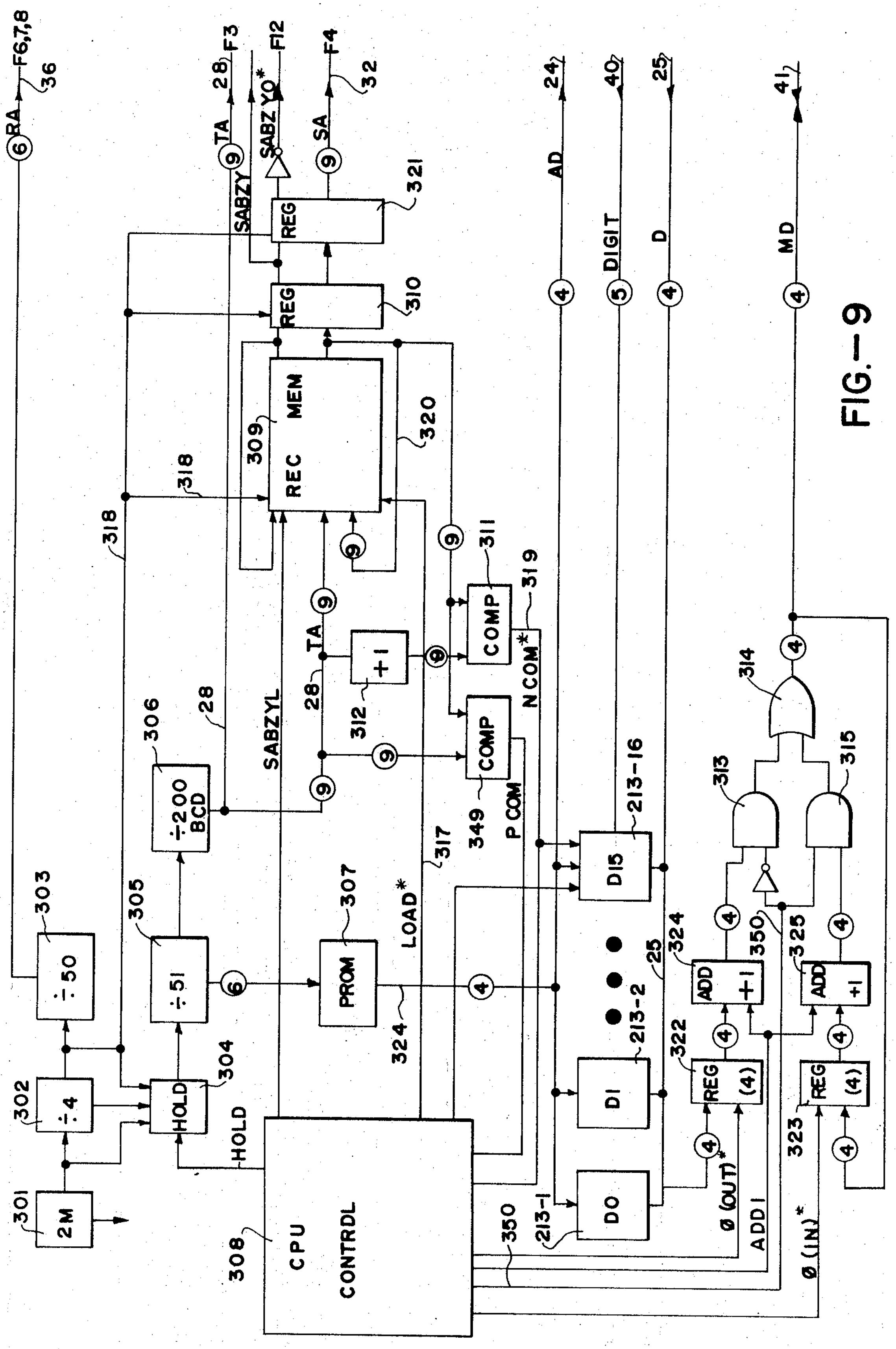
FIG. 9 is a schematic representation of the central processing unit (CPU) circuitry of FIG. 1 apparatus.

In FIG. 9, the central processing unit of FIG. 1 is shown in detail. The central processing unit is controlled by a master clock 301 and is operative to produce the receiver address on bus 36, the trunk address on bus 28 and the sample address on bus 32. Additionally, the central processing unit addresses a plurality of devices 213-1 through 213-16 by means of a device address bus 24. The devices 213 output data onto the 4-bit data (D) bus 25.

The D bus 25 connects to a register 322 and stores data with a $\phi$(out)* signal from the control 308. Similarly, the MD bus 41 from the CPU memory 14 of FIG. 1 is connected into register 323 on stores data on the signal $\phi$(in)*. Registers 222 and 223 connect to adders 324 and 325, respectively, which function to add one to the quantity in the registers 222 and 223. Adders 224 and 225 are operative on the signal ADD1 to make the addition, otherwise the data is gated straight through to the gates 313 and 315, respectively. Gates 313 and 315 are alternatively selected depending on the select signal on line 350. When the line 350 is a logical 1, gate 315 gates the MD bus data in register 323 back to the MD bus 41 through the OR gate 314. When the signal on line 350 is a logical 0, gate 313 gates the D bus data in register 322 onto the MD bus 41. New information from the D bus is gated into the memory via gate 313 or alternatively the old data within the memory is recirculated into memory through the gate 315. The adders 324 and 325 are used to increment the duration count within memory.

The formation of the addresses on the RA, TA, SA and AD buses commences under control of the master clock 301. The master clock 301 connects to a divide-by-4 counter 302 which in turn connects to a divide-by-50 counter 303. The counters 302 and 303 are conventional binary counters. A gate circuit 304 is operative to connect the clock pulses from the clock 301 and from the counter 302 through to a conventional divide-by-51 counter 305.

Counters 303 and 305 are stepped at the same frequency (0.5Hz) except when counter 305 is inhibited from counting by operation of gate 304. Gate 304 inhibits clock pulses to counter 305 under control of a HOLD signal from a CPU control 308. The parallel output of a counter 303 forms the receiver address (RA) bus 36. The output from counter 305 is input to a programmable read only memory (PROM) 307 which functions to form 4-bit addresses of the devices 213 on the AD bus 24.

The output from the binary counter 305 is connected to a divide-by-200 BCD counter 306. The BCD output on line 28 from counter 306 is the trunk address (TA) bus 28.

The output from the counter 306 is also connected as an input to the receiver memory 309. Receiver memory 309 is a recirculating register memory of 50 stages. Each stage has nine bits for storing input trunk addresses and one bit for a sample address busy indication SABZY. The ten bits per stage are shifted through the receiver memory 309 in synchronism with the stepping of the receiver address (RA) on bus 36. Accordingly, for any instant of time there is a unique location in the receiver memory 309 for each one of the fifty receivers 13 in FIG. 1. The trunk address (TA) on line 28 is loaded into the receiver memory by a LOAD* signal on the load line 317 from the control 308. When a trunk address is loaded into memory 309 by bus 28, that trunk address becomes the sample address (SA) which is associated with the receiver address (RA) then on the bus 36. A sample address is gated out from memory 309 into registers 310 and thereafter into register 321 each time the receiver address in counter 303 is stepped.

In order to identify the correlation between any given sample address (SA) within the memory 309 and its identical trunk address (TA) on bus 28, comparator 349 compares the output from the last stage of memory 309 with the address on bus 28 to form the present address compare PCOM signal. The PCOM signal connects to the CPU control 308 and is used in assigning and dropping receivers. Similarly, the address from receiver 309 is compared in comparator 311 with the trunk address (TA) on bus 28 as incremented by one in adder 312 to form the next address compare signal NCOM* on line 319. The NCOM* signal on line 319 is input to the CPU control 308 and the receiver buffer device 213-16. The NCOM* signal is used in connection with gating data from receivers on the DIGIT bus 40 into the receiver buffer 213-16.

In addition to the trunk address output from receiver 309, the sample address busy signals (SABZY and SABZYO*) are output to the control circuitry and are employed for identifying busy receivers.

Receiver Buffer - FIG. 10

In FIG. 10, the receiver buffer, which is device 213-16 of FIG. 9, is shown in further detail. The receiver buffer receives the DIGIT bus 40 from each of the receivers 13 in FIG. 1. Also the receiver buffer receives the receiver address bus 36 which is input to a read only memory 326 where it is decoded to provide the signals RBT, DPR and TTR. Those signals designate whether the currently addressed receiver on bus 36 is a ringback tone receiver or an answer supervision receiver, a dial-pulse receiver, or a multifrequency receiver. The RBT and DPR signals are each stored in the registers 327 and 328 which are stepped by the clock line 318. The registers 327 and 328 are stepped in synchronism with the registers 310 and 321 in FIG. 9.

The read only memory 326 is programmed to specify what type of receiver is being addressed by the line 36. At the time the trunk address (TA) compares with the next sample address (SA) as output from the comparator 311 in FIG. 9 to form the signal NCOM*, the RBT or DPR signals are gated from register 328 through gates 329 and 330, respectively, to form the DSTROBE and RSTROBE signals. The DSTROBE signal is operative to gate the DIGIT bus 40 into the register 332 if the currently addressed receiver in a dial-pulse receiver or a multi-frequency receiver. Alternatively, if the receiver is a ringback tone receiver or an answer supervision receiver, the RSTROBE signal gates 3 bits which correspond to bus 40 locations DIGIT(1), DIGIT(2), and DIGIT(4) into the 3-bit register 333. A sixth bit is input to register 332 through gate 334 if the read only memory 326 determines that the receiver is a multi-frequency receiver when the NDIGIT* signal is present.

The information in the registers 332 and 333 is transferred to the registers 336 and 337 at $\phi$(out) time whenever the AD bus decoder 339 decodes the AD bus 24 to designate STATUS. The $\phi$(out) and STATUS signals are input to the AND gate 341 to latch the information in the registers 336 and 337. The information in the locations corresponding to DIGIT(1), DIGIT(2), DIGIT(3) and DIGIT(4) are output to the D bus 25 whenever the AD decoder 339 outputs a NUM signal. The register locations are gated onto the D bus 25 in the D1, D2, D3 and D4 locations. The trunk busy (TBB) and the line busy (LBB) signals from two of the three bits in register 337 are gated out through the gates 344 when the decoder 339 decodes a BUSY signal. The outputs from gate 344 are connected to the D1 and D2 locations, respectively, of the D bus 25. The gate 343 gates out the RBTB signal when decoder 339 decodes a RING signal.

The overall founction of the receiver buffer of FIG. 10 is to receive the information on the DIGIT bus 40, to store that information in buffer registers, and to output the information on the D bus 25 at appropriate times in synchronism with the $\phi$(out) signal which also steps the CPU memory 14 of FIG. 1. The information of the D bus is transferred to the MD for storage in the appropriate location of the CPU memory 14.

Trunk Address and Duration Counter - FIG. 11

In FIG. 11, the trunk address and duration counter circuitry is shown and generally forms part of the CPU control 308 of FIG. 9. The function of the circuitry of FIG. 11 is to take the duration which is stored in the CPU memory 14 for each address as it appears on the MD bus 41 and store it in the register 351. Each time the AD bus 24 is decoded in decoder 361 to provide the DUR signal, the contents of the register 351 are parallel loaded into the counter 352. Counter 352 is a conventional 4-bit by six-stage parallel synchronous BCD counter. Counter 352 is operative to hold two decimal digits of seconds, two decimal digits of minutes and two decimal digits of hours for a total of six stages. The information in counter 352 can be gated out through the gates 353 and returned to D bus 25. In the absence of a 9 in the low order seconds digit, gates 354 and 355 are not called upon to increment the count in counter 352. Without a 9 in the low order digit, the WAIT signal to gate 356 is not energized so gate 356 cannot enable the output gate 353. In the case where a carry is to be propagated, however, the WAIT signal is energized. When energized, the WAIT signal inhibits further input of the trunk addressed on bus 28 to the register 358. Register 358 is held at the trunk address which requires a carry in a duration count associated with that trunk. The trunk address on bus 28 continues to count and when the trunk address again reaches the same trunk address as stored in register 358, comparator 359 detects that condition and outputs a TCOM signal which enables the gates 354, 355 and 356. The combination of a $\phi$(out) signal and a STATUS decoded from decoder 361 through gate 354 will increment counter 352 adding 1 to the duration. A DUR decode of decoder 361 through gate 355 will cause an input to counter 352 from gate 355 which will unload counter 352. A DUR input to counter 352 changes the mode from increment to shift thereby parallel loading or unloading of the counter. With the WAIT signal energized, and the DUR decode from decoder 361, the contents of counter 352 will be gated out through gate 353 onto the D bus where it will be returned in FIG. 9 to the MD bus for restorage in the CPU memory. The trunk address can be also be gated out to the D bus through the gates 360 which read out register 358 four bits at a time whenever decoder 361 decodes the TA signal and the WAIT* signal is input to gate 357.

Figure 12:
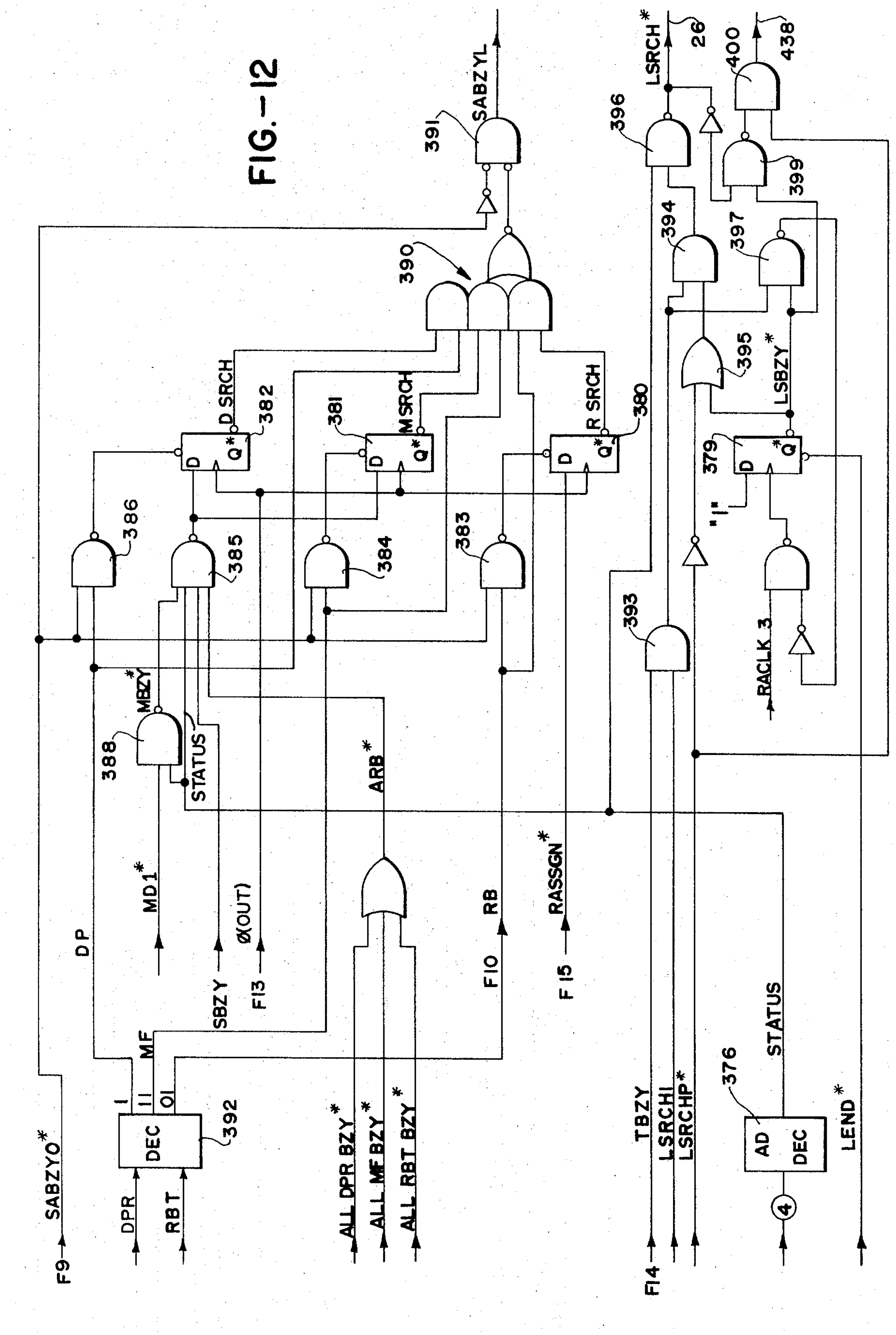
FIG.12. depicts a schematic representation of the search circuitry which forms a part of the CPU control within the central processing unit of FIG. 9.

Busy and Search Logic - FIG. 12

In FIG. 12, the busy and search logic is generally a part of the CPU control 308 of FIG. 9. The function of the FIG. 12 circuitry is to initiate line searches whenever the MD(2) bit in memory is not set and a SBZY* signal is received from the trunk interface unit of FIG. 3 which occurs at the start of each call. Also the circuitry of FIG. 12 functions to mark the busy bit in the receiver memory 309 of FIG. 9 busy whenever a search for a receiver has been initiated.

The line search signal LSRCH* on line 26 is transmitted to the LISB of FIG. 2. That signal on line 26 is generated in cooperation with the control circuitry of FIG. 14. A TBZY signal, indicating a busy trunk, is received from FIG. 14 along with a LSRCHI signal which are both input to the NAND gate 393. The LSRCHI signal is derived from the MD(2) location and signifies that a line search is requested for the particular trunk being addressed. With the trunk busy and the line search requested, AND gate 393 is satisfied and enables AND gate 394. The other input required to satisfy gate 394 is from the OR gate 395. Gate 395 has an output 1 whenever the signal LSRCHP* is a 0 indicating that the presently address trunk is the one currently having a line search in progress. Alternatively, if no trunk is currently carrying out a line search, as indicated by a 1 on the Q* output of flip-flop 379, gate 395 also has a 1 output. With gate 394 satisfied with two input 1's, NAND gate 396 is enabled so as to produce the output signal when the decoder 376 decodes the STATUS signal. When the LEND* signal is a 0 indicating an end to the line search, flip-flop 379 is cleared to a 1 on its Q* output.

The line search bush flip-flop 379 is set to a 0 on its Q* output, indicating a search in progress, by the operation of NAND gate 397. Gate 397 produces an output when the Q* output of flip-flop 379 is a 1, indicating a no-search in progress condition, and the output of gate 393 goes to 1 indicating that the currently addressed trunk requires the initiation of a line search. The output from gate 397 is inverted and clocked with a conventional clocking signal and is thereafter input to the D type flip-flop 379.

The flip-flops 380, 381 and 382 are set when a ring-back tone receiver, a multi-frequency receiver or a dial-pulse receiver search is undertaken, respectively. Flip-flop 380 is set to a 1 on its Q* output when a RASSGN* signal is presented at $\phi$(out) time. Flip-flop 380 is reset to a 0 on its Q* output by NAND gate 383 when the receiver memory 309 signifies with a signal SABZYO* that the receiver is not busy and with a RB signal indicating that a ring-back tone receiver is being addressed.

Flip-flops 381 and 382 are set to a 1 on their Q* outputs at STATUS time provided the memory is not busy as indicated by the signal MBZY* and the associated trunk is busy as indicated by the signal SBZY and provided all receivers are not busy as indicated by the signal ARB*. Those signals are combined in the NAND gate 385 to set both flip-flops 382 and 383. Flip-flop 381 is reset to a 0 on its Q* output by NAND gate 384. Gate 384 provides a 0 output whenever the receiver is a multi-frequency receiver, as indicated by the MF signal from decoder 392, and the receiver memory was not busy, as indicated by the logical 1 for the signal SABZYO*.

The flip-flop 382 is reset to a 0 on its Q* output whenever signal SABZYO* indicates a not-busy condition and the signal DP indicates that a dial pulse receiver is being addressed. Gate 386 sets the flip-flop 382 to a 1 on its Q* output. The 1 on the Q output from flip-flop 382 with a 1 on the DP signal is input to the AND gate of the AND/NOR gate 309 which provides a 0 input to NOR gate 391. With the 1 on the signal SABZYO* inverted to a 0 for input to the gate 391, gate 391 is satisfied to produce a 1 output signal SABZYL. The SABZYL signal is connected to the receiver memory 309 in FIG. 9 where it is loaded to store in 1 in memory to signify a busy condition.

In a similar manner, the flip-flop 381 Q* output is connectd to the AND/NOR gate 390 when a multi-frequency receiver is being addressed to load a busy signal via gate 391 into the corresponding receiver memory 309 location. Similarly, the flip-flop 380 is connected through gate 390 to load a busy signal into the memory when a ringback tone or an answer supervision receiver is being addressed.

Figure 13:
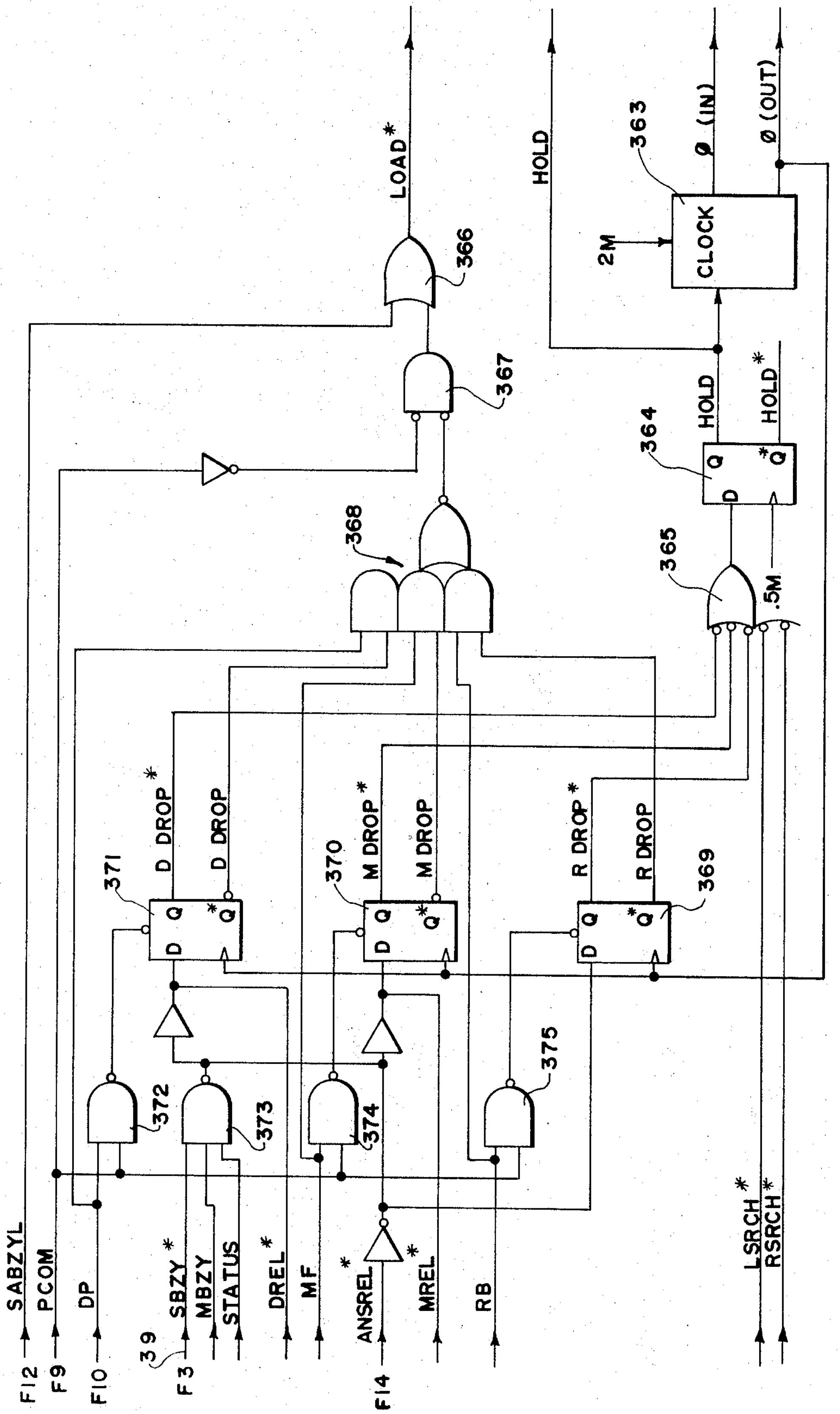
FIG. 13 depicts a schematic representation of the drop circuitry which forms a part of the CPU control within the central processing unit of FIG. 9.

Drop Control -FIG. 13

In FIG. 13, the drop logic is shown which together with the SABZYL signal causes a busy signal to be loaded into the receiver memory 309 of FIG. 9 by energization of the LOAD* signal. Whenever there is a logical 1 for the signal SABZYL, indicating that a busy signal is to be loaded into memory 309, that signal is inverted in the NOR gate 366 generating the LOAD* signal.

Similarly, the LOAD* signal can be generated by an output from the NOR gate 367. Gate 367 is enabled to produce a logical 1 output when the PCOM* signal, from FIG. 9, signifies that the trunk address is the same as the sample address in the current location of the receiver memory 309. The logical 0 input required to satisfy gate 367 is derived from the AND/NOR gate 368. Gate 368 produces a 0 output if it is a ringback tone receiver and a RDROP signal is derived from flip-flop 369, or if it is a multi-frequency receiver and a MDROP signal is received from flip-flop 370, or it is a dial-pulse receiver and a DDROP signal is derived from flip-flop 371. Flip-flop 371 is set with a 1 on its Q* output either by a DREL* signal or by the output of gate 373. Gate 373 provides a 0 on its output whenever the signal on SBZY* is a 1 and the signal MBZY is a 1 at the STATUS time as decoded from the AD bus 24. Flip-flop 371 is preset with a 1 on its Q output whenever gate 372 is satisfied by a 1 DP signal and a 1 PCOM signal. Those conditions signify that it is a dial-pulse receiver being currently addressed and the sample address of the receiver is the same as the trunk address.

Flip-flop 370 is set to a 1 on its Q* output in response to either a MREL* signal, a ANSREL* signal or a signal indicating that the trunk is not busy and the memory is busy at STATUS time as output from gate 373. Flip-flop 370 is held in a preset state with a 0 on a Q* output by gate 374 whenever the trunk address and the sample address compare and when the receiver currently being addressed is a multifrequency receiver.

The Q outputs from each of the flip-flops 369 through 371 are input to the NAND gate 365. When any of the flip-flops are going to drop a receiver or a line search or a receiver search is to be carried out, NAND gate 365 provides a 1 input to flip-flop 364. Flip-flop 364 responsively provides a HOLD signal on its Q output. The HOLD output is input to a clock circuit 363 which functions to provide a master clock signals $\phi$(in) and $\phi$(out). Clock circuit 363 is a 0.5M countdown of the two megacycle signals established, for example, by the 2M source 301 in FIG. 9.

Figure 14:
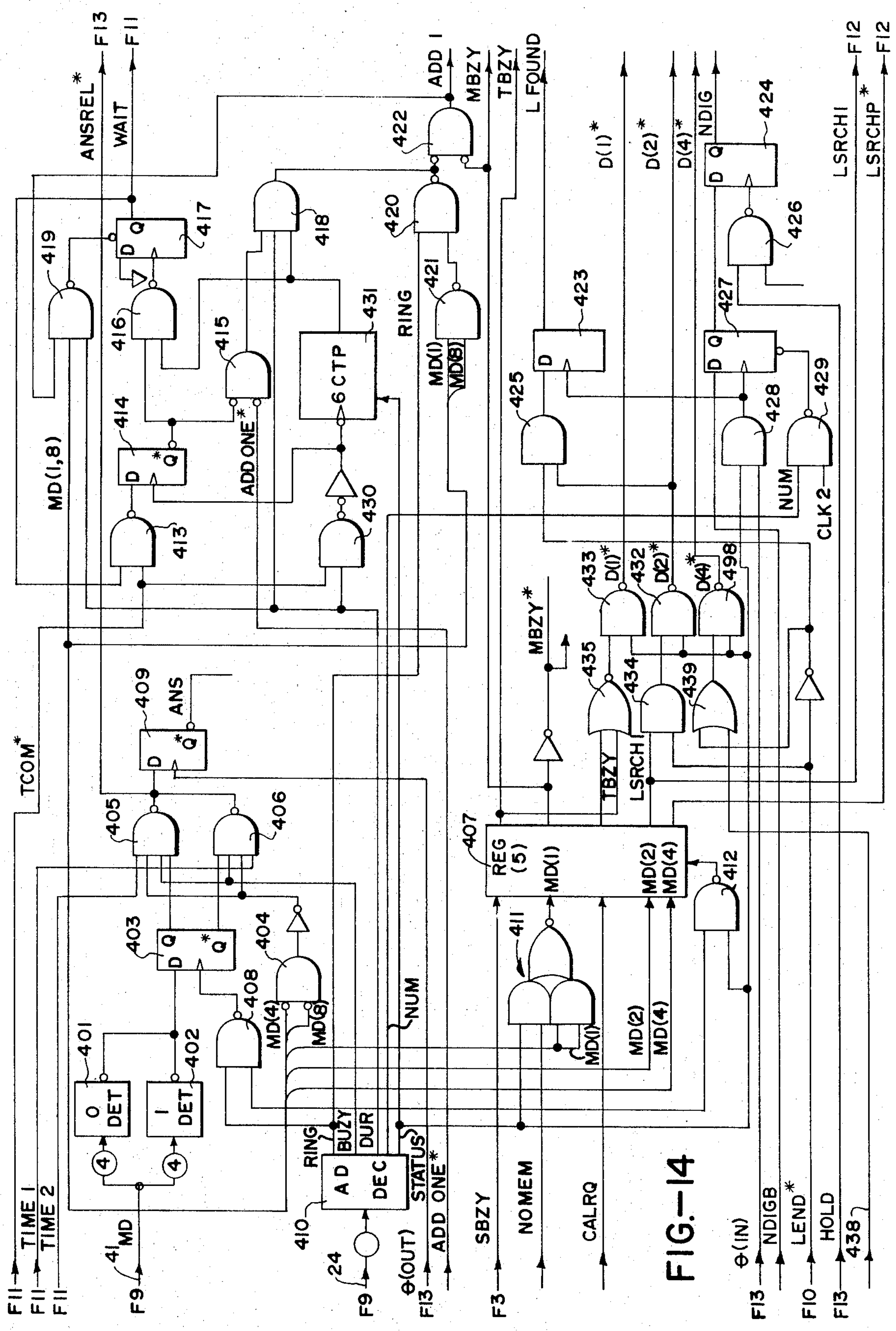
FIG. 14 depicts a schematic representation of the control circuitry which forms a part of the CPU control within the central processing unit of FIG. 9.

Control - FIG. 14

In FIG. 14, the control portion of the CPU control of FIG. 9 is shown in further detail. The circuitry of FIG. 14 performs many functions. The 0 detect circuit 401 receives the MD bus 41 input for detecting all 0's. The detector 402 also receives the MD bus 41 input for detecting all 1's. The output of the detectors 401 and 402 are OR'ed to set the flip-flop 403 when clocked by the NAND gate 408. Gate 408 is satisfied at $\phi$(out) time whenever the AD decoder 410 decodes a RING signal. NAND gate 405 functions to detect the absence of a ring signal for a time determined by the signal TIME 2 derived from the counter of FIG. 11 which is typically sixteen seconds. Gate 405 is satisfied when there are 0's on both lines MD(4) or MD(8) through the NOR gate 404 when decoder 410 decodes a BUSY signal, provided the flip-flop 403 has been set with a 1 on its Q output. The output from gate 405 signifies that there has been no ring for at least sixteen seconds and therefore the receiver is to be released as controlled by the ANSREL* signal. Similarly, the gate 406 has TIME 1 input which is derived after eight seconds. Gate 406 signifies that there has been no ring in the last eight seconds and therefore the ANSREL* signal is to be generated to drop the receiver.

The control circuitry of FIG. 14 also operates to generate a WAIT signal from flip-flop 417 whenever a carry occurs in the duration count. The AND gate 419 operates to detect the MD(1) and MD(8) signals whenever the decoder 410 decodes a DUR signal. Gate 419 is only enabled if an ADD 1 signal is present from the gate 422. Gate 422 is in turn enabled only if counter 431 has counted and determined that it is the sixth character of the duration count thereby indicating that it is the low order seconds bit. Counter 431 is cleared by a STATUS signal from the decoder 410. Counter 431 then counts each of the DUR signals through gate 430 at a time when the TCOM signal is present. Gate 415 gates the ADDONE* signal provided that the flip-flop 414 has its Q* output set to a 0 which indicated that we are not in a WAIT condition.

Gate 415 causes gate 418 to be satisfied, which in turn causes gate 422 to be satisfied, which in turn causes gate 419 to be satisfied, which presets the flip-flop 417 to generate the WAIT signal. The WAIT signal in turn is transmitted to FIG. 11 where it causes the addition of one to the duration count in the manner previously described. The TCOM* signal in FIG. 11 is generated in response to the WAIT signal which is then input to the gate 413 in FIG. 14. Gate 413 is then satisfied and produces a 0 input to flip-flop 414 which sets flip-flop 414 to a 1 on its Q* output. The 1 on the flip-flop 414 Q* output is input to the NAND gate 416 which together with the output from counter 431 enables gate 416 to clock a 0 into flip-flop 417 thereby resetting the Q output to a 0.

In FIG. 14, the register 407 latches busy information at STATUS, time as determined by decoder 410, in response to a $\phi$(out) signal input to AND gate 412. The register 407 has five bits. The first bit receives the sleeve busy signal SBZY from the trunk interface of FIG. 3. The output from that first bit position is the trunk busy signal TBZY. The SBZY signal, therefore, serves to set the TBZY signal.

The second bit position of register 407 is for the memory busy signal which is derived from the MD (1)* signal of the MD bus 41. The output from the second bit position is the memory busy signal MBZY.

The third bit of register 407 receives the CALRQ signal for use in designating a calendar request print out.

The fourth bit of the register 407 receives the MD(2) signal of the MD bus 41 and stores the LSRCHI initiation request. Normally, all trunks request a search until an LEND signal is received. A search is initiated, however, only for busy trunks.

The fifth bit of register 407 stores the MD(4) location of the MD bus 41. That location stores the TSRCHP* signal. Only one trunk is permitted to have a LSRCHP signal as a logical 1 at any one time.

The TBZY signal from register 407 is gated through NOR 45 to the NAND gate 433 where it is gated at STATUS time to the D1* position of the D bus 25. The D(1)* signal gated to the MD(1)* signal and subsequently returns as an input to register MD(1)*

The LSRCHI signal from register 407 is gated through AND 434 to the NAND gate 432. Gate 434 allows the LSRCHI signal to be gated through until the LEND signal signifies the end of the line search. When LEND* is 0, gate 434 forces its output to 0 causing gate 432 to write a 1 for signal d(2)*. The 1 for D(2)* causes the MD(2) signal to be a 0 signifying that a line search should not be requested for that line.

The MD(4) signals for all trunks are normally 1's as they appear in the register 407. The 1 output represents the signal LSRCHP* thereby signifying that a line search is not being performed. In the absence of a LEND signal, gate 498 has a 1 output to form the signal D(4)*. That one output from gate 198 represents a 0 for the signal MD(4) when the D bus is selected. A 0 for the signal MD(4) indicates that the associated trunk is the one which has a line search in progress. As is indicated hereafter in connection with FIG. 17, the D bus is only selected at STATUS time.

In FIG. 14, the signal which is gate onto the D(4)* line of the D bus is normally a 0. When the D bus is gated to the MD bus the 0 on D(4)* becomes a 1 on MD(4). The 0 on D(4)* appears from gate 498 at STATUS time when OR gate 439 has a 1 output. Gate 439 has a 1 output when line 438 from FIG. 12 has a 1 which occurs when gate 400 receives two input 1's. The latter 1's occur when a line search is not in progress, LSRCHP is 1, and NAND gate 399 has a 1 output. Gate 399 has a 1 output whenever either no line search pulse has been started, LSRCH is 0, or the line search busy flip-flop 379 is set busy, LSBZY* is 0.

The signal gated onto the D(4)* line is a 1 when the output from gate 439 is 0. This condition initially occurs when either a line search is in progress, LSRCHP* is 0, or a line search command has been given, LSRCH is 1, and the busy flip-flop 379 has not been set, LSBZY* is 1. A 0 on D(4)* gated as a 1 to MD(4) signifies that the currently addressed trunk is the only trunk permitted to be carrying out a line search.

After completion of a line search, the line end signal, LEND* equal 0, forces the output of gate 439 to 1 which restores D(4)* to 0 and MD(4) to 1. Also, the busy flip-flop 371 is cleared by LEND*.

Referring to FIG. 14 when LSRCHI is a 1 and a line search is done, D(2)* becomes set to a 1 by gate 434 as previously explained. The 1 on D(2)* will be a 1 through gate 425 to flip-flop 423 to produce an LFOUND signal. However, if an error was made during the line search D(2)* will be a 0, and the flip-flop 423 will not be set.

Flip-flop 427 is set in response to a NDIGB signal at $\phi$(in) time when STATUS has been decoded by the decoder 410. The Q output of flip-flop 427 is stored in flip-flop 424 unless a HOLD signal has been generated through gate 426.

Figure 16:
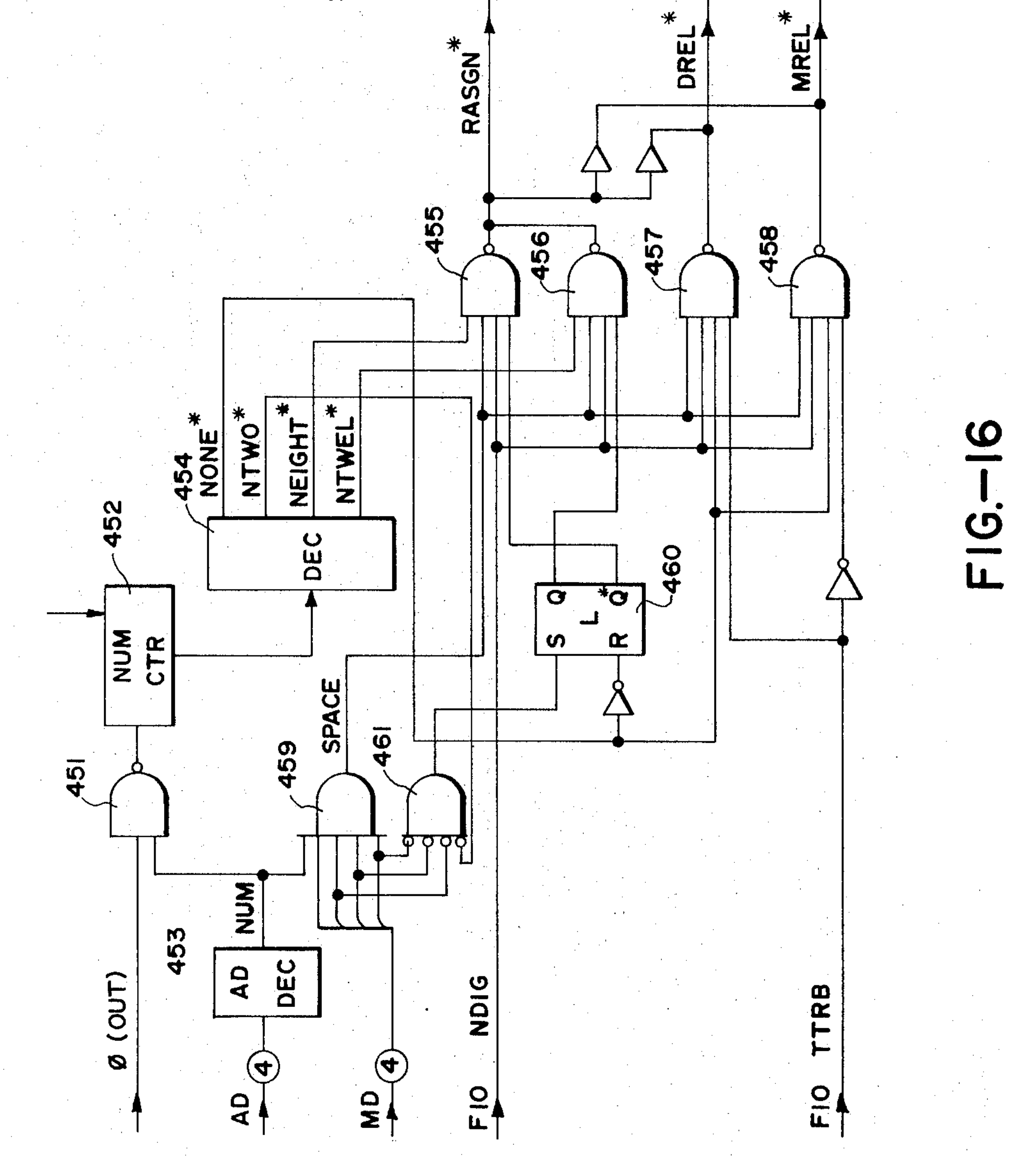
FIG. 16 depicts a schematic representation of the receiver assign and release generator.

Receiver Assign and Release Generator - FIG. 16

Referring to FIG. 16, the number counter 452 is a 4-bit binary counter for counting the digits in the called number. Counter 452 counts at $\phi$(out) time each time AD decoder 453 decodes the Ad bus to obtain the NUM signal. Counter 452 has its count decoded by the decoder 454 to produce the output signals NONE*, NTWO*, NEIGHT* and NTWEL*. The NAND gate 455 is signaled by the eighth count from decoder 454 when the MD bus has an empty space during the NUM decode of decoder 453. The empty space is detected by the AND gate 459 which receives the MD bus on its four inputs. Additionally gate 455 receives the NDIG signal and the Q* output from the long distance flip-flop 460. The long distance flip-flop 460 has a 1 on its Q* output unless it has been set for a long distance call. The long distance flip-flop 460 is set by the NOR gate 461 which has as its input the NTWO* signals signifying the second digit of the number and the MD bus lines, MD(2), MD(4), and MD(8) signals. Flip-flop 460 is set, therefore, by observing whether or not the second dialed digit is a 0 or a 1. Gate 455 is satisfied to assign a receiver by the signal RASGN* provided flip-flop 460 indicates that it is not a long distance call and the eighth digit has been dialed.

NAND gate 456 causes a receiver to be assigned by generation of the signal RASGN* if flip-flop 460 has been set to indicate a long distance call and decoder 454 indicates that it is the twelfth number which has been dialed.

The NAND gate 457 causes the dial-pulse receiver to be dropped by generation of the signal DREL* if, when the first number has been dialed and it is indicated by the signal TRRB from FIG. 10, that it is a multifrequency receiver.

If the TTRB signal indicates that it is not a multifrequency receiver, then NAND gate 458 causes the multi-frequency receiver to be dropped by generation of the signal MREL*. If a ring-back tone receiver is assigned by the generation of the signal RASGN*, then both the signals DREL* and MREL* are generated to drop the dial-pulse and multifrequency receivers.

Figure 17:
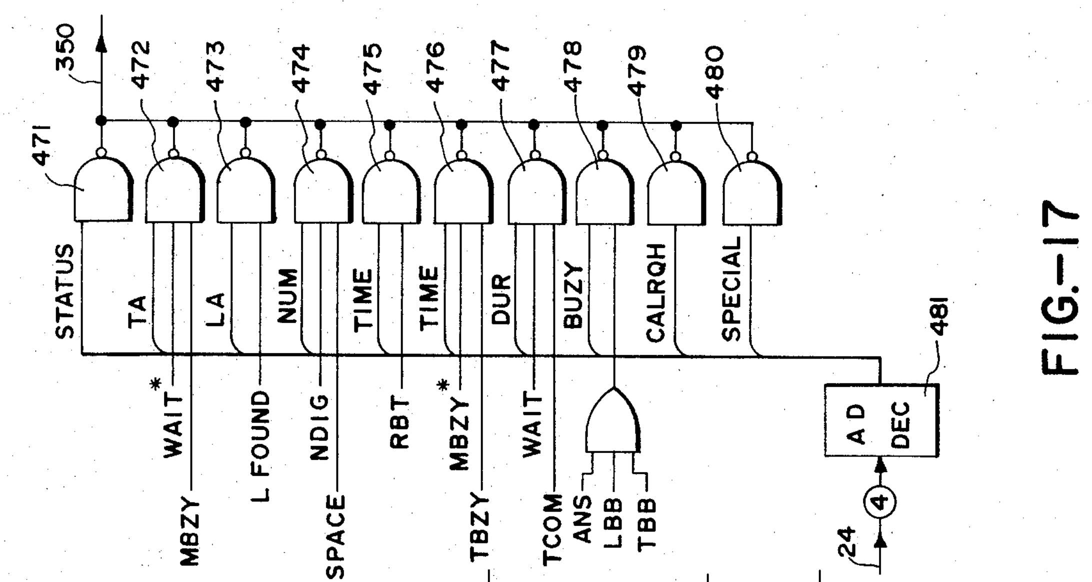
FIG. 17 depicts a schematic representation of the D bus and MD bus selection circuitry which forms part of the CPU control in FIG. 9.

D Bus and MD Bus Selection - FIG. 17

Referring to FIG. 17, the NAND gates 471 through 480 are operative when selected to select the line 350 which connects to the gate 313 and 315 in FIG. 9. When line 350 is selected as a logical 0, the D bus 25 information is gated to the memory MD bus 41. When line 350 is not selected, the MD bus information is recirculated back into memory without change.

Each of the gates 471 through 480 is selected by a different decode of the AD bus input to the AD decoder 481. The AD decoder 481 selects the lines in sequence. The first output selected is STATUS which is input to gate 471. The D bus information is gated to the MD at STATUS time.

Gate 472 is satisfied if a TA decode occurs when the WAIT signal is not present when the memory busy is set.

The gate 473 selects the contents of the D bus for gating onto the MD bus when the LA is decoded after a line search has ended and a LFOUND signal has been generated.

Gate 474 is operative to gate the contents of the D bus onto the MD bus upon the NUM decode if a new digit is present as indicated by NDIG at a time when the current number location is empty as indicated by the signal SPACE. Gate 475 is operative to gate the contents of the D bus to the MD bus to reset the duration counter whenever a TIME is decoded while a ringback tone is present as indicated by the signal RBT.

Gate 476 is operative to gate the contents of the D bus to the MD bus if at the TIME decode time, the trunk busy signal TBZY is present but the MBZY signal is not present.

Gate 477 is operative to gate the contents of the D bus to the MD bus if the system in a WAIT and the TCOM signal has been received.

Gate 478 is operative to gate the contents of the D bus to the MD bus if during the BUSY decode a line busy, a trunk busy or an answer supervision signal has been detected.

Gate 479 is operative to gate out a calendar request and gate 480 is symbolic of other gates which can be employed to generate special characters.

Summary of Operation

To commence operation, the normal condition is that all trunks are not busy and no subscriber or station is off hook. Under these conditions, the central processing unit 9, as represented in further detail in FIG. 9, has the clock 301 generating its 2MHz output and by countdown, generates the trunk address (TA). Similarly the receiver address (RA) is generated. In FIG. 9, the counter 305 is outputting its code to the read only memory 307. For each new trunk address, memory 307 scans through all the decodes of the AD bus. The first decode for each new trunk address, which is output from the counter 306, is the STATUS decode. During the STATUS decode, the system checks the busy conditions to see if there has been any call for service. Since with all trunks and all stations idle there is no busy signal, no information is gated from the D bus to the MD bus.

When a call for service is sensed by the trunk interface circuit 10, a signal is generated on the SBZY* line 39 indicating that the trunk currently being addressed by the count in counter 306 of FIG. 9 is busy.

In the manner previously explained, the trunk busy signal is stored in the CPU at the trunk address location in memory. The CPU memory new data is compared with the old data and is interpreted as a call for service.

With a call for service, a line search is first initiated to identify the calling station by means of generating an ID signal on the trunk sleeve and looking for a return signal on the station sleeve.

Multi-frequency and dial-pulse receivers are assigned at this time. The assignment of the receivers is done by circulating the receiver memory 309 in FIG. 9 until a not busy receiver of each type is found. When a not busy receiver is found, the trunk address is loaded into the receiver memory 309 and that address becomes the sample address correlated with a specific receiver. When the first dialed pulse is detected, a drop signal is generated to drop the not used receiver.

Dial pulses are continuously detected by the connected receiver on a time-division-multiplex basis. Each time a new digit is detected, it is transferred from the receiver to the receiver buffer and stored in the CPU memory.

After the appropriate number of digits of the dialed number have been recorded, the receiver is dropped.

In a system not having answer supervision, a ringback tone receiver is assigned after 8 dialed digits for a local call or after 12 dialed digits for a long distance call. The ringback tone detector receiver is dropped if a pause of, for example, eight seonds between dialed digits or if the first digit to be dialed is not received within sixteen seconds.

After a ringback tone has ceased to exist, the duration count is updated each second as the CPU memory data circulates. The update is done by an add one signal in the circuits 324 or 325 of FIG. 9 on a one-second command from the CPU control 308.

The system continues to monitor each call until the sleeve idle condition is again detected. At that time, the CPU memory 14 is employed to dump its information through the data dump register 15 to I/O devices 16.

While the invention has been particularly shown and described with reference to preferred embodiments thereof it will be understood by those skilled in the art that various changes in form and details may be made therein without departing from the spirit and the scope of the invention.

What is claimed is:

1. A message metering system for detecting and storing information concerning station usage of outgoing trunk lines, the improvement comprising, means for addressing said trunk lines with a sample address SA, a plurality of addressable receivers for connection when addressed to said trunk lines, each of said receivers including means to sample and analyze signals on a connected trunk line to produce output information, means for addressing said receivers with a receiver address RA, means for stepping said sample address SA and said receiver address RA in synchronism whereby trunk lines addressed by said sample address are sampled and analyzed by receivers addressed by said receiver address, respectively, means for storing the information from said receivers in a memory location unique to each trunk line

2. The apparatus of claim 1 further including means for changing said receiver address relative to said sample address whereby trunk lines are connected to different receivers.

3. The apparatus of claim 1 further including assign logic means for assigning receivers to busy trunks.

4. The apparatus of claim 1 further including drop logic means for dropping unneeded receivers.

5. The apparatus of claim 4 including means for dropping daid receivers after a timed duration.

6. A message metering apparatus for detecting and storing information relating to telephone station usage of trunk lines where the station lines are connected to the trunk lines through a switching exchange, the improvement comprising, trunk means for addressing said trunk lines with trunk addresses for detecting the busy condition of the trunk lines, sample means for addressing the trunk lines with sample addresses for sampling the information on busy trunk lines, a plurality of receivers addressable by receiver addresses for storing information sampled by said sample means, means for stepping said sample addresses and said receiver addresses in synchronism, trunk memory means having unique storage locations associated with each trunk address for storing data, store means for storing information from said receivers into said memory at locations defined by said trunk addresses.

7. The apparatus of claim 6 wherein said trunk means connect to tip, ring and sleeve lines for each trunk and said trunk means further include means for detecting the order in which the tip and ring lines become busy relative to the sleeve line to distinguish between incoming and outgoing trunks calls.

8. The apparatus of claim 6 wherein said sample means include means for forming analog samples and means for forming dial pulse samples , and wherein said plurality of receivers include ringback tone receivers and dial pulse receivers wherein said dial pulse samples are connected to said dial pulse receivers and said analog samples are connected to said ringback tone receivers.

9. The apparatus of claim 6 further including assign means for assigning receivers to busy trunk lines , drop means for dropping receivers whereby said receivers become available for reassignment.

10. The apparatus of claim 9 wherein said assign means includes a receiver memory addressed with said receiver address, includes means for storing the busy status of each of said receivers, includes means for setting said receiver memory busy in response to the assignment of a particular receiver at a location in said receiver memory corresponding to the receiver address, and wherein said drop means includes means for resetting said location not busy in response to the dropping of said particular receiver.

11. The apparatus of claim 6 further including, master clock means, a receiver address counter for counting down said master clock and having an output for providing said receiver addresses, a character counter for counting down the output from said master clock means to define a plurality of characters, a trunk address counter receiving the output from said character counter for providing said trunk addresses, a receiver memory for storing a busy bit and storing a sample address for each of said receivers and including means for circulating said receiver memory in synchronism with said receiver address counter, means for loading trunk addressed from said trunk address counter into said receiver memory at locations corresponding to specific receivers whereby a trunk address becomes associated with a corresponding receiver to define a sample address, output means for said receiver memory for connecting sample addresses to said sample means.

12. The apparatus of claim 11 further including a plurality of devices addressable by said character counter for providing information to said trunk memory means.

13. The apparatus of claim 6 wherein said store means further includes a receiver buffer for receiving information from said receivers for gating to a data bus and wherein said apparatus includes selection means responsive to said character counter for gating said data bus to a memory bus connected as an input to said trunk memory means.

14. A message metering system for detecting and storing information relating to telephone station usage of outgoing trunk lines where the station lines are connected to the trunk lines through a switching exchange, the improvement comprising, trunk address means for addressing said trunk lines with a trunk addresses for detecting the outgoing busy condition of the Trunk lines, sample means for addressing the trunk lines with sample addresses for sampling the information on the trunk lines, a plurality of receivers including dial pulse, multifrequency and ringback tone receivers addressable by receiver addresses for storing information sampled by said sample means, means for stepping said storage addresses and said receiver addresses in synchronism, a storage means having unique storage locations associated with each trunk address, means for addressing said storage means by said trunk addresses, means for reading information from said receivers into said memory.

15. In a message metering system including receivers for detecting and analyzing information concerning station usage of outgoing trunk lines, the improved method comprising the steps of, addressing said trunk lines with sample addresses, addressing receivers with receiver addresses, stepping said storage addresses and said receiver address in synchronism whereby the trunk lines at said sample addresses are connected to be sampled and analyzed by assigned receivers at said receiver addresses, respectively, storing the information from said receivers in a memory location unique to each trunk line.

16. The method of claim 15 further including the step of changing a receiver address relative to a sample address whereby trunk lines are connected to different receivers.

* * * * *